US012567552B2

(12) United States Patent
Wynn et al.

(10) Patent No.: US 12,567,552 B2
(45) Date of Patent: *Mar. 3, 2026

(54) AUTOMOTIVE BATTERY CONDUCTOR PLATES WITH FUSIBLE LINKS

(71) Applicant: Rivian IP Holdings, LLC, Plymouth, MI (US)

(72) Inventors: Nathaniel Christopher Wynn, Newport Beach, CA (US); Kyle William Butterfield, Ladera Ranch, CA (US); Tyler David Collins, Irvine, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 999 days.

This patent is subject to a terminal disclaimer.

(21) Appl. No.: 17/684,614

(22) Filed: Mar. 2, 2022

(65) Prior Publication Data

US 2022/0190445 A1      Jun. 16, 2022

Related U.S. Application Data

(63) Continuation of application No. 16/548,316, filed on Aug. 22, 2019, now Pat. No. 11,302,997.

(Continued)

(51) Int. Cl.
*H01H 85/044*      (2006.01)
*B60R 16/04*      (2006.01)
(Continued)

(52) U.S. Cl.
CPC ........... *H01H 85/044* (2013.01); *B60R 16/04* (2013.01); *H01M 50/213* (2021.01);
(Continued)

(58) Field of Classification Search
CPC .......... H01H 85/044; H01M 2085/025; H01M 50/213; H01M 50/503; H01M 50/517; H01R 11/287; B60R 16/04
See application file for complete search history.

(56) References Cited

U.S. PATENT DOCUMENTS

2008/0030295 A1      2/2008  Matsumoto et al.
2013/0337291 A1      12/2013  Mayer et al.
(Continued)

FOREIGN PATENT DOCUMENTS

CN      103779518 A      5/2014
CN      106785183 A      5/2017
(Continued)

OTHER PUBLICATIONS

International Search Report and Written Opinion received for PCT Patent Application No. PCT/US2019/047698, mailed on Nov. 18, 2019, 10 pages.

*Primary Examiner* — Brittany L Raymond
(74) *Attorney, Agent, or Firm* — HG LAW LLP

(57)      ABSTRACT

A conductor plate assembly for providing an electrical connection between a plurality of battery cells of a battery package for an electric vehicle is described. The conductor plate assembly includes a plurality of first conductor plates, at least one second conductor plate, a plurality of fusible links at the at least one second conductor plate configured to connect the at least one second conductor plate to multiple battery cells, and a plurality of non-fusible links at the plurality of first conductor plates configured to connect the plurality of first conductor plates to plural battery cells. Related apparatuses, systems, and methods are also described.

22 Claims, 20 Drawing Sheets

Related U.S. Application Data

(60) Provisional application No. 62/721,951, filed on Aug. 23, 2018.

(51) Int. Cl.

| | | |
|---|---|---|
| *H01H 85/02* | (2006.01) | |
| *H01M 50/213* | (2021.01) | |
| *H01M 50/503* | (2021.01) | |
| *H01M 50/517* | (2021.01) | |
| *H01R 11/28* | (2006.01) | |

(52) U.S. Cl.
   CPC ....... *H01M 50/503* (2021.01); *H01M 50/517* (2021.01); *H01H 2085/025* (2013.01); *H01R 11/287* (2013.01)

(56) References Cited

U.S. PATENT DOCUMENTS

| | | |
|---|---|---|
| 2014/0205874 A1 | 7/2014 | Zhou |
| 2014/0255748 A1 | 9/2014 | Jan et al. |
| 2017/0084893 A1 | 3/2017 | Kaiser et al. |
| 2017/0125773 A1 | 5/2017 | Liu |
| 2017/0222207 A1 | 8/2017 | Pezdek et al. |
| 2017/0256769 A1 | 9/2017 | Wynn et al. |
| 2018/0108955 A1* | 4/2018 | Fees ........................ B60K 11/02 |
| 2018/0190960 A1* | 7/2018 | Harris ................... H01M 50/20 |

FOREIGN PATENT DOCUMENTS

| | | | |
|---|---|---|---|
| CN | 107078263 A | | 8/2017 |
| WO | 2017-088719 A1 | | 1/2017 |
| WO | WO 2017-088719 | * | 6/2017 |

\* cited by examiner

219

225

213

AUTOMOTIVE BATTERY CONDUCTOR PLATES WITH FUSIBLE LINKS

This application is a continuation (CON) of U.S. patent application Ser. No. 16/548,316 filed Aug. 22, 2019 entitled "Automotive Battery Conductor Plates With Fusible Links," which claims the benefit of U.S. Provisional Patent Application No. 62/721,951 filed Aug. 23, 2018 entitled "Automotive Battery Conductor Plates With Fusible Links," the entire contents of both of which are incorporated herein by reference.

TECHNICAL FIELD

The present disclosure relates to batteries for automotive vehicles including electric vehicles and more particularly to conductor plates of multi-cell batteries for electric automotive vehicles.

BACKGROUND

Automotive electric vehicles typically have a multi-cell battery as an energy storage device. Such batteries must undergo a severe duty cycle, which includes electric charging and discharging. Typical batteries have multiple modules of electrochemical cells that are combined in a carefully optimized package where some modules are electrically connected in series, and some are electrically connected in parallel. Automotive design requirements require use of hundreds, and sometime thousands, of individual electrochemical cells in a single vehicle battery. Large number of cells, limits of manufacturing capabilities, and severe duty cycle may lead to a failure of one or multiple cells in an automotive battery. When such cell failure occurs, and sometimes when such failure has not yet occurred but is imminent, electrical resistance of an individual cell or of a group of cells may drop. Depending on electrical configuration of a battery package, such drop of electrical resistance may lead to significant increase in electrical current flowing though the affected cells. High electric current may lead to overheating of the cells and other battery components, leading to a thermal runaway and to endangering safety of the electric vehicle.

Battery designers have used various approaches to reducing probability of such thermal events. Some of the known devices and techniques for improving thermal robustness of electric vehicle batteries include a current interrupt device (CID), a pressure temperature current (PTC) switch, and use of cell level fuses. Known cell level fuses are typically wire bonds introduced between cells. In an event of overcurrent leading to overheating, such wire bonds are designed to melt and break the electrical connection to affected cells. When a cell is no longer electrically connected to the rest of the battery, no current flows through it anymore, which may help prevent a thermal runaway event from initiating or from propagating.

The present inventors have observed, however, that wire bonding has technical limitations and may negatively impact the battery. For example, wire bonds measurably increase pack level electrical resistance, and the use of wire bonds also increase manufacturing time and cost. Typically, wire bonds are ultrasonically welded to the battery cells, a process that may take up to two seconds per cell. With about 7,500 cells in a typical electric vehicle battery, wire bonding may contribute over two hours to a battery manufacturing time. Furthermore, this process typically has a low yield and may require significant rework. If wire bond manufacturing reliability is at 99%, then about 150 bonds per battery may need to be reworked when two wire bonds per cell are used. A rework is typically a manual process that results in significant cost and time added to battery manufacturing.

Therefore, the present inventors have observed a need for an alternative method of providing protection to an electric vehicle multi-cell battery that would improve reliability, reduce cost, and increase manufacturing yield.

SUMMARY

According to an example, a battery for an automotive vehicle comprises a plurality of battery cells and a first conductor plate assembly providing an electrical connection between the plurality of battery cells. The first conductor plate assembly comprises a plurality of first conductor plates, at least one second conductor plate, a plurality of fusible links at the at least one second conductor plate for connecting the at least one second conductor plate to multiple battery cells, and a plurality of non-fusible links at the plurality of first conductor plates for connecting the plurality of first conductor plates to plural battery cells.

According to another example, a method of electrically connecting electrochemical cells in an automotive battery is described. The method comprises providing a plurality of battery cells, providing a first conductor plate assembly comprising a plurality of first conductor plates and at least one second conductor plate, electrically connecting multiple battery cells to the at least one second conductor plate using a plurality of fusible links, and electrically connecting plural battery cells to the plurality of first conductor plates using a plurality of non-fusible links.

According to another example, a conductor plate assembly for providing an electrical connection between a plurality of battery cells of a battery package for an electric vehicle is described. The conductor plate assembly comprises a plurality of first conductor plates, at least one second conductor plate, a plurality of fusible links at the at least one second conductor plate and configured to connect that at least one second conductor plate to plurality battery cells, and a plurality of non-fusible links at the plurality of first conductor plates and configured to connect the plurality of first conductor plates to multiple battery cells.

The subject matter described herein may provide many technical advantages including, e.g., more rapid manufacturing of automotive multi-cell batteries at a module level, robust protection of multi-cell batteries in a thermal event, preventing overcurrent from initiating a thermal runaway, and improved vehicle safety. Examples of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings generally indicate like elements.

DETAILED DESCRIPTION

Figure 1A:
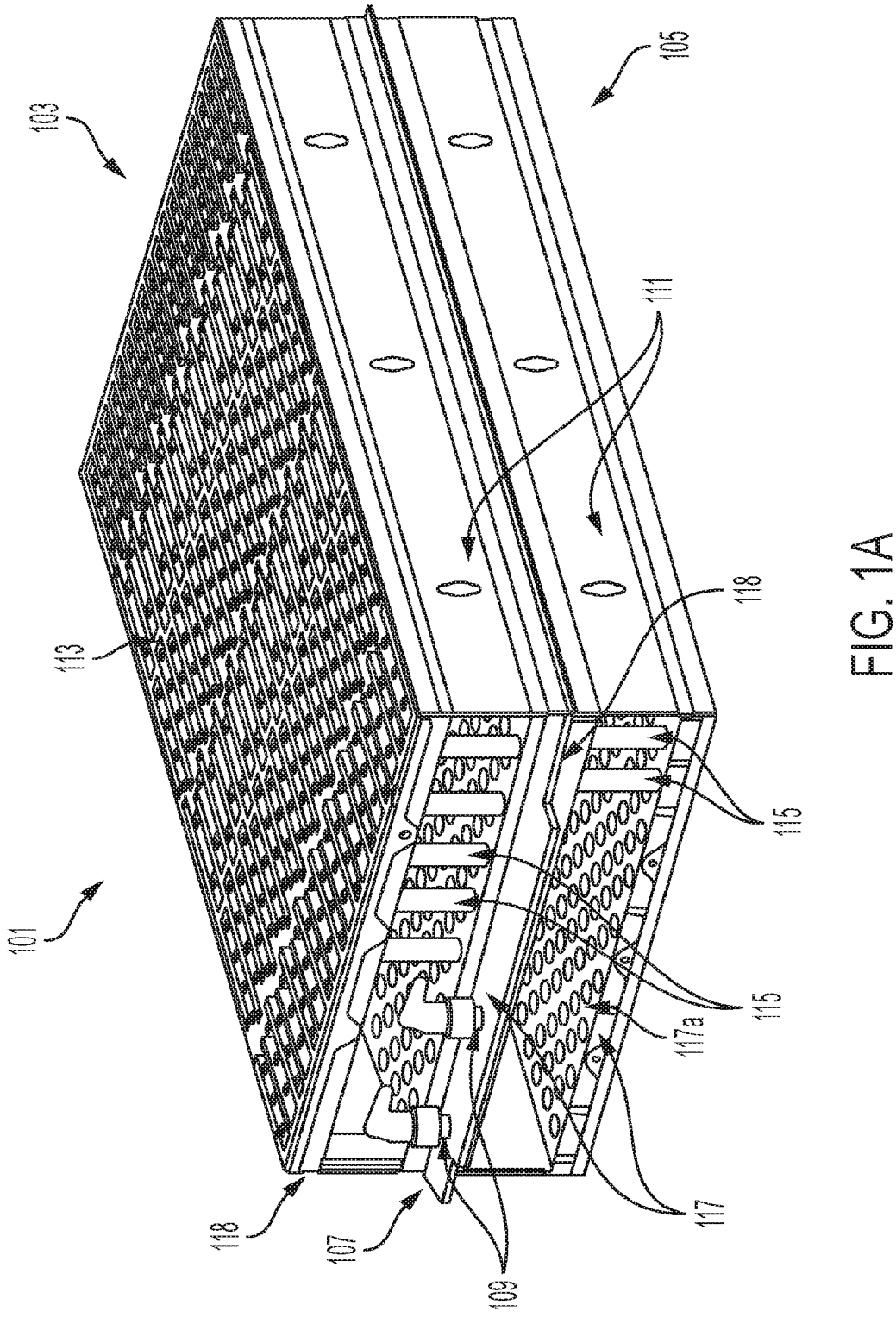
FIGS. 1A-1B are diagrams illustrating an example of a battery for an automotive vehicle.
Figure 1B:
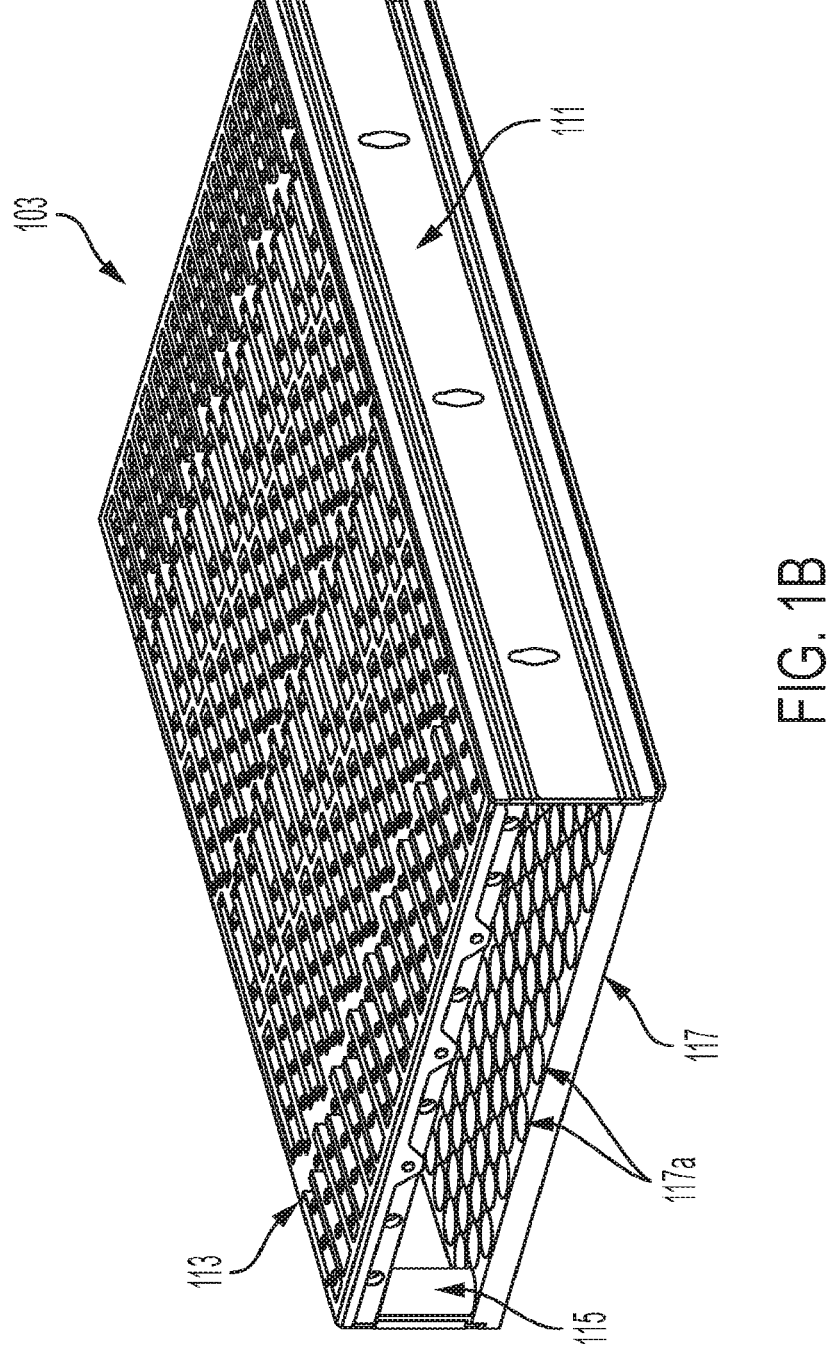

FIGS. 1A-1B are diagrams illustrating an example of a battery for an electric vehicle such as an automotive vehicle that may be utilized on roadways for transporting passengers and/or cargo, wherein the battery is configured for powering an electric drive system to provide propulsion of the vehicle as well as for powering other vehicle systems. A typical battery package 101 may include two battery modules or assemblies 103 and 105, each comprising a plurality of electrochemical battery cells 115, only several of which are illustrated in FIG. 1A in order to avoid obscuring other portions of the modules 103 and 105. A top module 103 may be identical to a bottom module 105. In other words, top module 103 and bottom module 105 may have the same structure and have the same number of electrochemical battery cells 115. In this case, modules 103 and 105 may be referred to as a top half-package 103 and a bottom half-package 105. Alternatively, top module 103 and bottom module 105 may have the same structure but have a different number of electrochemical cells 115. Battery package 101 may also contain only one module, or more than two modules.

Each module 103, 105 may be structured with a rectangular frame that serves as enclosure for enclosing and protecting the electrochemical cells 115. As shown in FIGS. 1A and 1B, a module 103, 105 may each include a first frame member 117 (also called a tray) which may include a plurality of recesses 117a (also called nests) that receive and hold (secure) at least one end of a battery cell 115. The recesses 117a each have a cross sectional shape (e.g., circular) and a depth configured to secure a battery cell 115, an end of which fits into the recess 117a. The recesses 117a may be arranged in a pattern or array, such as a hexagonal close-packed array, square array, or any other suitable array or pattern. A module 103, 105 may also include a second frame member 118 and two or more side frame members 111 (or side plates). In some examples, the second frame member 118 may be configured as a rectangular ring of structural material positioned at a periphery of the module 103. In some examples, the second frame member 118 may extend across a length and width of the battery package 101 and may contain apertures that permit portions of the battery cells 115 to extend therethrough, such that the battery cells may be further secured and supported. The side plates 111, first frame member 117 and second frame member 118 may be secured together using any suitable fastening mechanism, e.g., bolts, screws, fastening clips, rivets, welds, adhesives, etc. so as to provide a structurally rigid assembly for holding and securing the battery cells 115, and may be made of any suitably strong materials such as metal alloy (e.g., aluminum alloy, steel alloy, etc.), carbon fiber composite, other composite materials, plastic, and like, including combinations thereof. Module 103 also comprises a conductor plate assembly 113 secured to the module 103 that provides electrical connections between electrochemical cells 115 and that will be described in more detail herein. Similarly, module 105 also comprises a conductor plate assembly (not visible in FIG. 1A) like conductor plate assembly 113.

FIG. 1B shows only one electrochemical cell 115, and FIG. 1A shows only several, for purposes of illustration to avoid obscuring other aspects of the module structure, but it will be appreciated that a typical module 103, 105 may have a large number of cells 115. The number of cells 115 in modules 103, 105 and number of modules 103, 105 in battery package 101 determine the overall number of cells 115 in battery package 101. The total number of cells in a battery generally depends on the electric vehicle design requirements. Larger numbers of cells can provide for greater energy storage for an electric vehicle, greater distance range, an ability to utilize faster acceleration while still maintaining adequate range, and greater power delivery, e.g., for larger vehicle sizes, etc. Smaller numbers of cells in a battery can reduce battery cost, weight, and size and may have lower cooling lower cooling requirements. The number of cells 115 in battery package 101 may be between ten and one hundred, between one hundred and one thousand, between one thousand and ten thousand, or between ten thousand and one hundred thousand. The number of cells 115 in a battery module 103, 105 may be between ten and one hundred, between one hundred and one thousand, between one thousand and five thousand, or between five thousand and twenty thousand.

As reflected above, side plates 111 provide structural stability to the modules 103, 105, which are configured to have size and strength suitable for holding the desired number of battery cells 115. Side plates 111 may also control spacing between conductor plate assembly 113 and tray 117. Side plates 111 may be hollow to allow for better cooling of the module 103 and of cells 115 and may have design features that allow for easier connection of module 103 to another module 105 if battery package 101 has more than one module. Side plates 111 also may have provisions for securing battery 101 in its packaging space in a vehicle. Side plates 111 may be made of metal alloy (e.g., aluminum alloy, steel alloy, etc.), carbon fiber composite, other composite material, plastic, and like, including combinations thereof. Modules 103, 105 each may have two side plates 111, in which case these two side plates 111 may be located on two opposite sides of the module 103, 105. Modules 103, 105 may each have four side plates 111, in which case these four side plates 111 may be located on each of the four sides of the module 103, 105 between the conductor plate assembly 113 and the tray 117.

As shown in FIG. 1A, battery package 101 may have a cold plate 107 for cooling the battery cells 115. Cold plate 107 may be attached to frame member (tray) 117 at a side of module 103 and may extend along a full length of that side of the module 103. If battery package 101 has two half-packages 103 and 105, then battery package 101 may have cold plate 107 located between, and constrained by, two half-packages 103 and 105, the cold plate being in thermal contact with a frame member 117 or 118 to provide battery cooling. The battery package 101 may include more than one cold plate 107, e.g., where battery package 101 has two or more modules 103, 105. In some examples, the number of cold plates may be one less than a number of modules in a battery package. In this case, each cold plate 107 may be located between, and constrained by, a pair of adjacent modules. Each cold plate 107 may have coolant flowing through it. Each cold plate may have two coolant connectors 109, one of which may be used for coolant inlet and the other may be used for coolant outlet.

As noted above, module 103 may have a conductor plate assembly 113 that provides electrical connections between electrochemical cells 115, and module 105 likewise may have such a conductor plate assembly. The conductor plate assembly 113 can be made of any electrically conductive material, including, but not limited to, aluminum, copper, nickel, alloys thereof, other metallic alloys, other electrically conductive materials, and combinations thereof. Selection of the material(s) for the conductor plate assembly 113 may depend on the design requirements for the battery 101, as will be appreciated by those of skill in the art. While higher electrical conductivity, lower density, lower cost, and better manufacturing properties (to allow for faster and less expensive stamping, extrusion, and welding) are preferred, and selection of suitable materials may involve balancing these considerations. Conductor plate assembly 113 may have provisions for attaching module 103 to other modules in a battery, e.g., tabs, holes, latches, etc., for fastening. Conductor plate assembly 113 also may have provisions for attaching the battery 101 to its packaging space within a vehicle, e.g., tabs, holes, latches, etc., for fastening.

As noted above, modules 103 and 105 may have a tray 117. Tray 117 provides support for electrochemical cells 115. Tray 117 may be a thin rectangular structure that includes recesses 117a (or nests) on one side for positioning individual electrochemical cells 115. Tray 117 also allows for controlling the spacing between adjacent battery cells 115. A side of the tray 117 opposite to the side where cells are located may be adjacent to the cold plate 107. Tray 117 may be made of metal alloy (e.g., aluminum alloy, steel alloy, etc.), carbon fiber composite, other composite materials, plastic, and like, including combinations thereof. Specific geometry and material of tray 117 may be selected based on battery design requirements. It is preferred for a tray to be thinner and to have higher thermal conductivity to provide better cooling of cells 115 by the cold plate 107. On the other hand, thicker tray made out of stronger material may provide better structural stability to the module 103 and better support to cells 115. It is also desired for tray material to have lower density and good manufacturing properties to allow for lower cost, shorter manufacturing time, and higher yield.

Figure 2A:
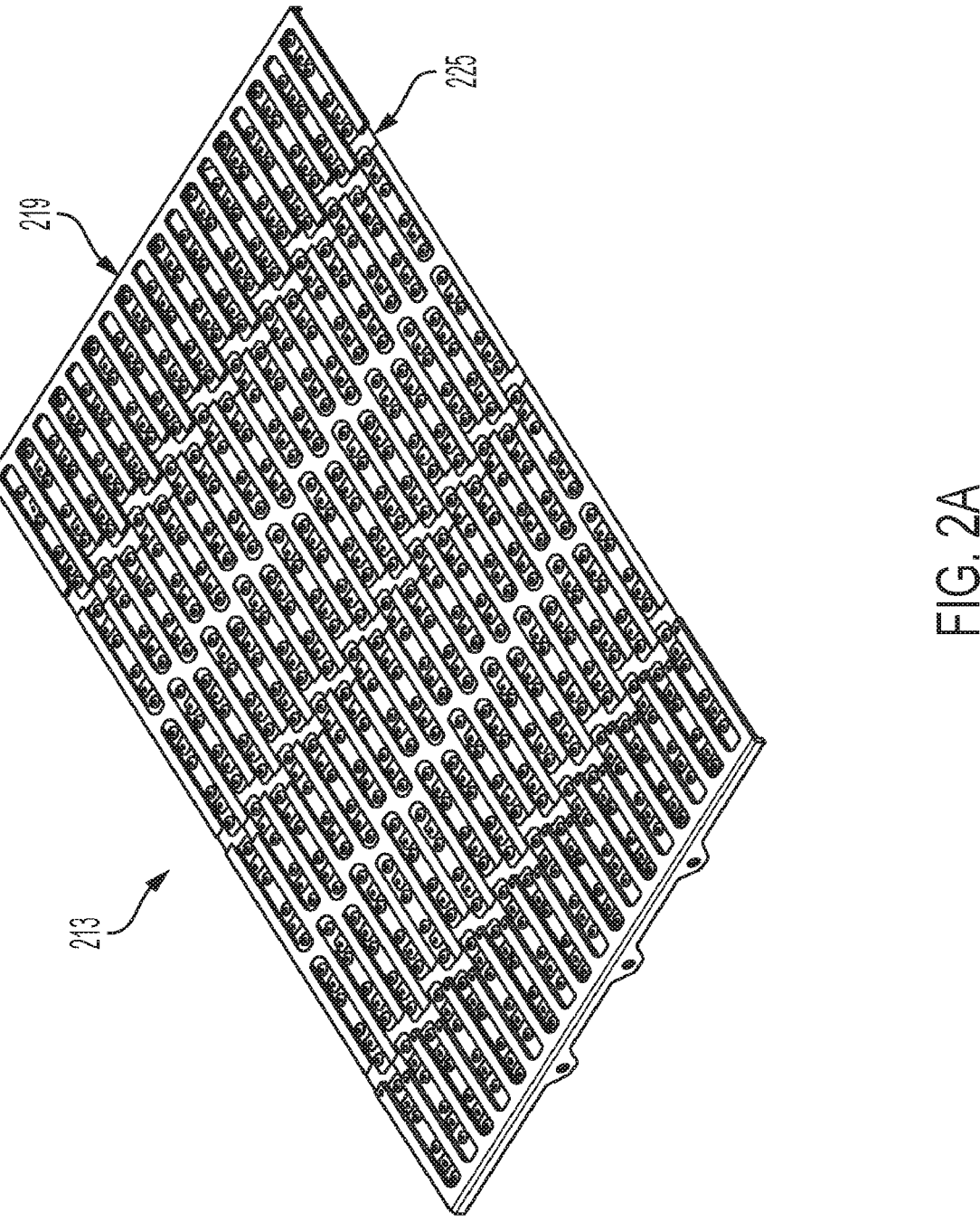
FIGS. 2A-2C are diagrams illustrating an example of conductor plate assembly.
Figure 2B:
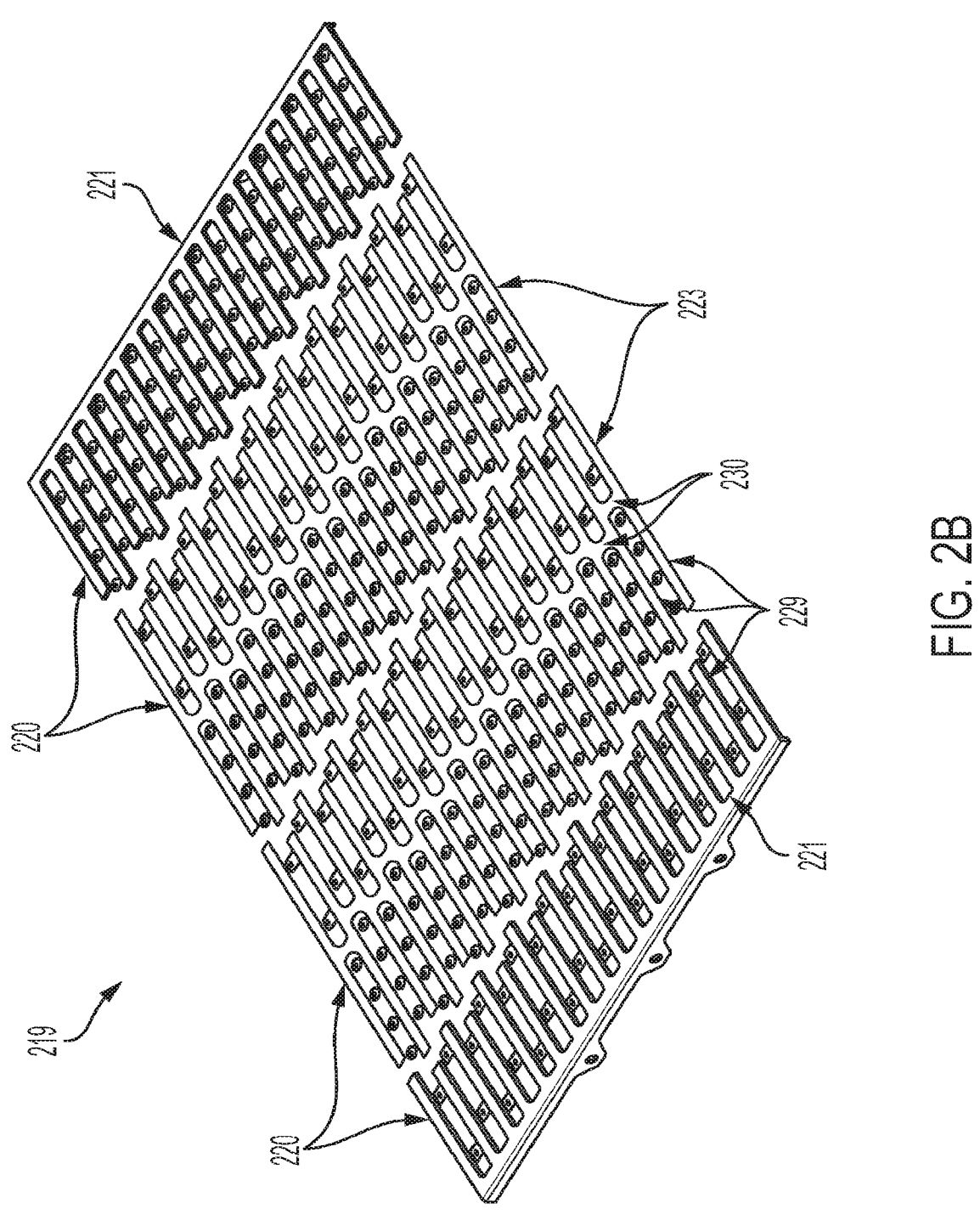
Figure 2C:
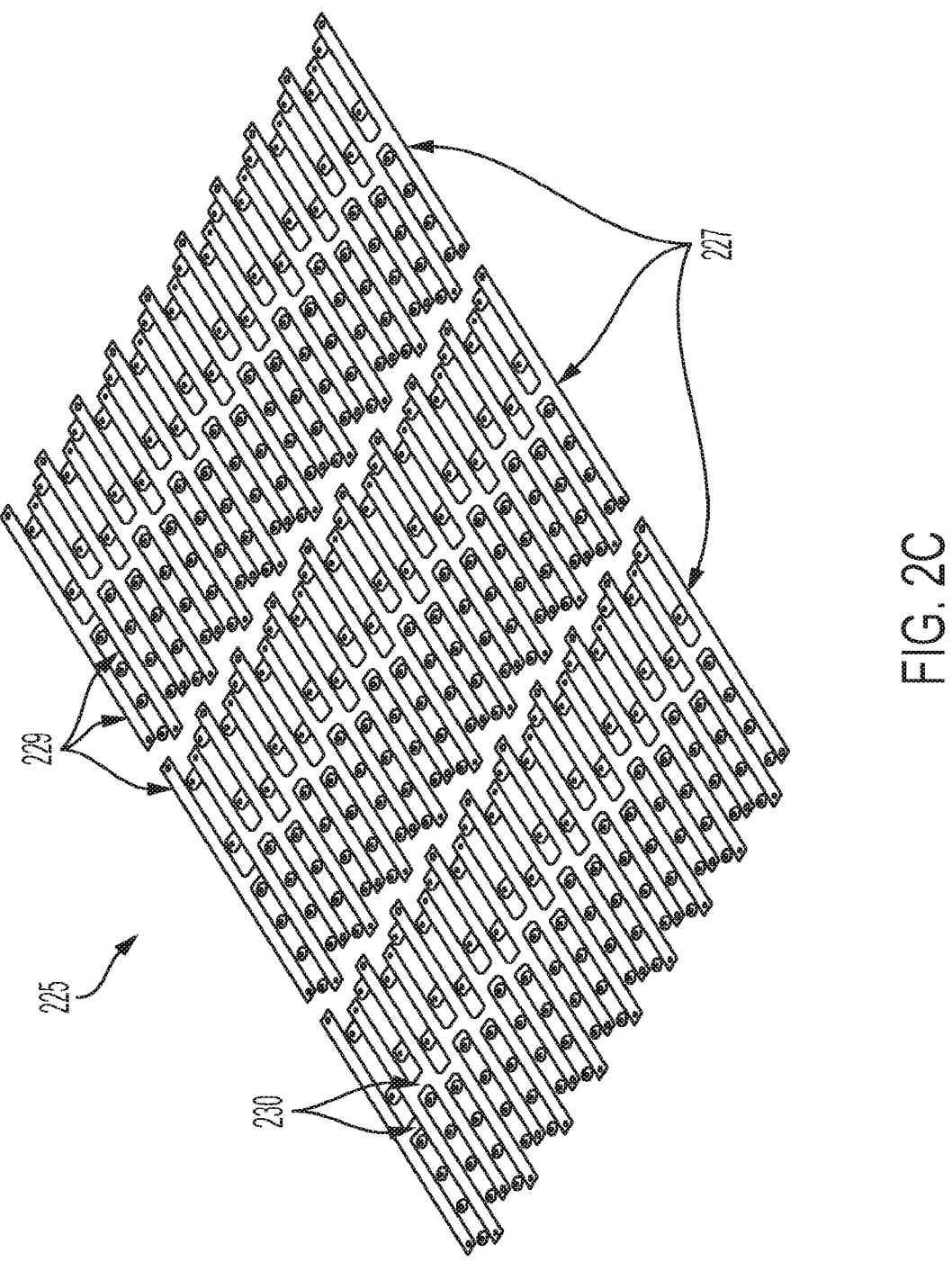

FIGS. 2A-2C are diagrams illustrating an example of a conductor plate assembly 213 that may be used, e.g., for conductor plate assembly 113 shown in FIGS. 1A and 1B. Conductor plate assembly 213 may have a top (first) conductor plate set 219 and a bottom (second) conductor plate set 225. It should be appreciated that the words top and bottom are not intended to be limiting herein regarding any particular orientation of a battery package 101 in a vehicle, and are simply used for convenience of description to indicate, e.g., that top in this example may mean further away from a battery cell 115 and that bottom may mean closer to such battery cell 115. As shown in FIG. 2B, top conductor plate set 219 may have one or more top conductor plates 220. Top conductor plates 220 may include one or more top conductor end plates 221 and one or more top conductor middle plates 223. In an example, top conductor plate set 219 has two top conductor end plates 221 and at least one top conductor middle plate 223. In an example, top conductor plate set 219 has two top conductor middle plates 223. As shown in FIG. 2C, bottom conductor plate set 225 may have one or more bottom conductor plates 227. In an example, bottom conductor plate set 225 has three bottom conductor plates 227. In an example, the number of bottom conductor plates 227 may be one less than the number of top conductor plates 220. Either a top conductor plate or a bottom conductor plate may be referred to as simply as a conductor plate.

In such arrangement, some bottom conductor plates 227 correspond to one top conductor end plate 221 and one half of one top conductor middle plate 223 that is adjacent to that top conductor end plate 221. Other bottom conductor plates 227 correspond to one half of one top conductor middle plate 223 and to one-half of another top conductor middle plate 223, where these two top conductor middle plates are adjacent to each other. Each top conductor end plate 221 corresponds to one-half of one bottom conductor plate 227. Each top conductor middle plate 223 corresponds to one-half of one bottom conductor plate 227, and one-half of another bottom conductor plate 227, where these two bottom conductor plates 227 are adjacent to each other. In this paragraph, the term "corresponding" means that the mentioned conductor plates are electrically connected to the same electrochemical cells.

Top conductor plate set 219 and bottom conductor plate set 225 may be thin rectangular structures, with about the same area. They may be assembled together to make a conductor plate assembly 213. When so assembled, top conductor plate set 219 and bottom conductor plate set 225 are electrically isolated from one another by electrically insulating material, such as an electrically insulating sheet (not shown). When conductor plate assembly 213 is assembled into a battery package, bottom conductor plate set 225 is positioned adjacent to electrochemical cells, such that it is sandwiched between electrochemical cells and the top conductor plate set 219, with an electrically insulating material (e.g., electrically insulating sheet) disposed between the top conductor plate set 219 and bottom conductor plate set 225.

For a given group of cells, the plate which is locally the top plate has the opposite polarity of the plate which is locally the bottom plate. For adjacent groups of cells, the polarities of the corresponding plates locally top and bottom plates may be reversed. This arrangement allows the electrochemical cells to be assembled in a number of groups, such that groups of cells are electrically connected in series, while all cells within the same group are electrically connected in parallel. The more groups are connected in series, the higher voltage the battery will be able to provide. The more cells are connected in parallel in each group, the higher energy storage capacity the battery will have.

Each top conductor plate 220 and each bottom conductor plate 227 may have one or more beams 229. In an example, all conductor plates 220 in a top conductor plate assembly have a same number of beams 229, and all conductor plates 227 in a bottom conductor plate's assembly have a same number of beams. Beam 229 may have a rectangular cross section with one side longer than another. A short side of beam's cross-section may be called a thickness of the beam. A long side of beam's cross-section may be called a width of the beam. The dimension of the beam in the direction perpendicular to both thickness and width of the beam may be called the length of the beam. Width of beam 229 may be in plane with the conductor plate assembly. Length of beam 229 may also be in plane with the conductor plate assembly. Thickness of beam 229 may be perpendicular to the plane of the conductor plate assembly. A ratio of the width of beam 229 to the thickness of beam 229 may be 2:1, or 5:1, or 10:1, or 20:1, or between 2:1 and 5:1, or between 5:1 and 20:1, or between 20:1 and 100:1. A ratio of the length of beam 229 to the width of beam 229 may be 5:1, or 10:1, or 20:1, or 50:1, or between 2:1 and 5:1, or between 5:1 and 20:1, or between 20:1 and 100:1. The number of beams on each conductor plate may be between 2 and 5, between 5 and 10, or between 10 and 100.

In an example, beams 229 belonging to the same conductor plate may be parallel to each other. Beams 229 belonging to the same conductor plate may be equidistant from each other. Adjacent beams 229 belonging to the same conductor plate may be connected by a plank 230. Plank 230 may have the same thickness as the beam 229. A width of plank 230 may be the same as width of beam 229, or may be between 0.5 and 2.0 times the width of beam 229. Ratio of length of plank 230 to its width may be 1:1, or 1.5:1, or 2:1, or between 0.5:1 and 2:1, or between 1:1 and 5:1. Each beam other than the beams on the edge of the conductor plate may have two planks connected to it. In this case, two planks may be connected to the same location along the length of the beam. In an example, two planks are connected to two different locations along the length of the beam, such that these two planks are offset from each other. The ratio of this offset to the length of the plank may be 0.5:1, or 1:1, or 2:1, or between 0.2:1 and 1:1, or between 1:1 and 10:1. Beam 229 and plank 230 may be made of the same material. In an example, beams and planks of each conductor plate may be formed from sheet metal in a stamping operation. Top conductor end plates may have rails added to them after stamping operation to provide for securing the conductor plate assembly to the rest of the battery module, or for securing battery module to the rest of the battery package, or for securing battery package to its location within a vehicle.

Figure 3:
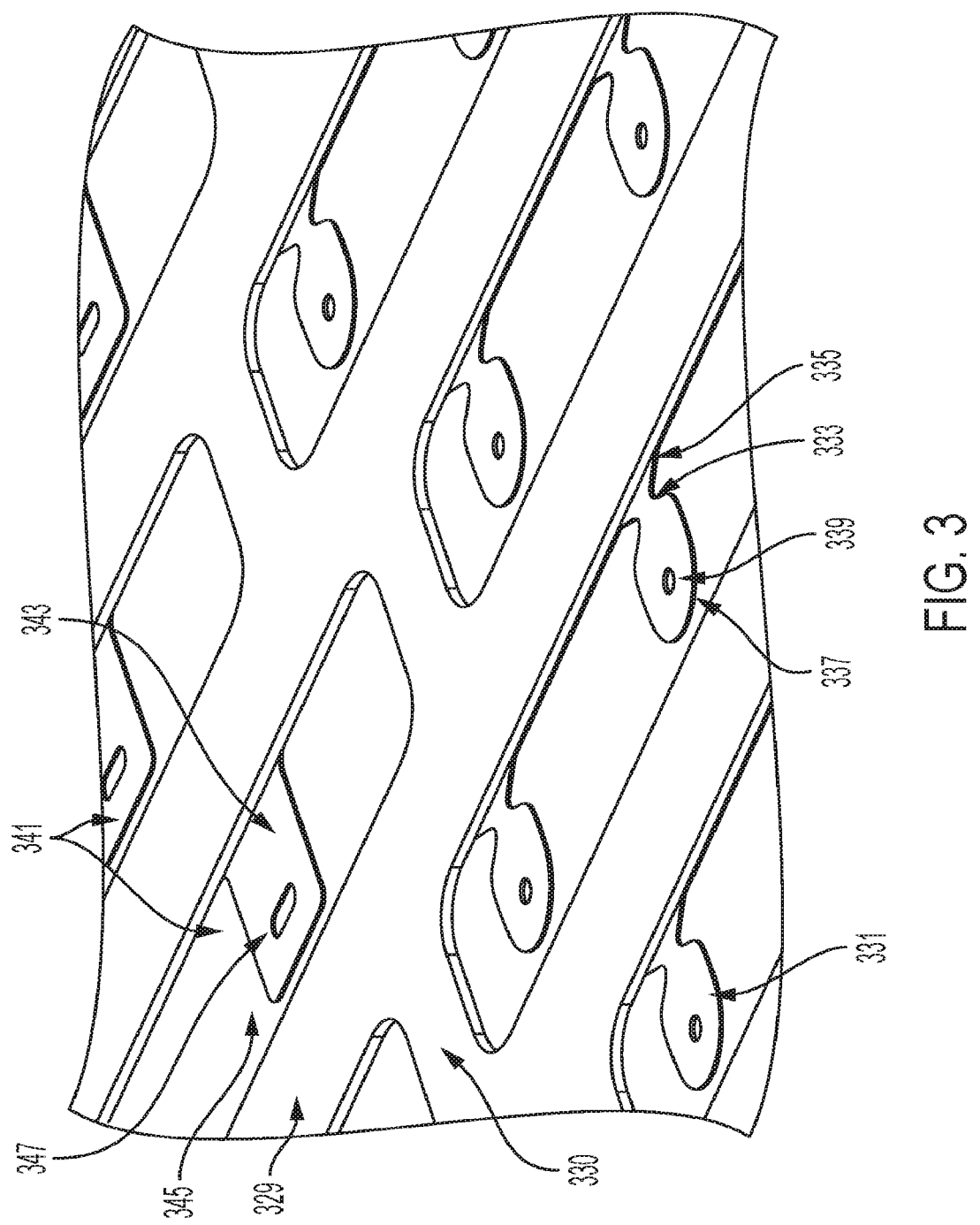
FIG. 3 is a diagram illustrating an example of fusible and non-fusible links of a conductor plate.

FIG. 3 is a diagram illustrating an example of fusible and non-fusible links of a conductor plate. In an example, each beam 329 may have one or more fusible links 331 and one or more non-fusible links 341. Fusible link 331 may provide an electrical connection between the beam 329 and one or two electrochemical cells of the battery module. Non-fusible link 341 may also provide an electrical connection between the beam 329 and one or two electrochemical cells of the battery module. Fusible links 331 and non-fusible links 341 may be made from an electrically conductive material, such as a metal or metal alloy. In an example, fusible links 331 and non-fusible links 341 may be stamped from copper, aluminum, nickel, or their alloys.

Fusible link 331 may have a root 335, while non-fusible link 341 may have a root 343. Roots 335 and 343 are the areas where fusible link 331 and non-fusible link 341, respectively, connect to the beam 329. Fusible links 331 and non-fusible links 341 may be made in the same stamping process that creates beams 329 and conductor plate. Alternatively, fusible links 331 and non-fusible links 341 may be made in a separate process (for example, by a stamping process) and then welded to the beam 329. Fusible links 331 and non-fusible links 341 may have pads. Fusible links 331 may have pads 337, and non-fusible links may have pads 345. Both pads 337 of fusible links 331 and pads 345 of non-fusible links may be thinner than beams 329 and thinner than planks 330. A ratio of thickness of beam 329 to thickness of pad 337 of fusible link 331 may be 2:1, or 10:1, or 100:1, or between 1:1 and 5:1, or between 5:1 and 100:1, or between 50:1 and 1000:1. A ratio of thickness of plank 330 to thickness of pad 337 of fusible link 331 may be 2:1, or 10:1, or 100:1, or between 1:1 and 5:1, or between 5:1 and 100:1, or between 50:1 and 1000:1. A ratio of thickness of beam 329 to thickness of pad 345 of non-fusible link 341 may be 2:1, or 10:1, or 100:1, or between 1:1 and 5:1, or between 5:1 and 100:1, or between 50:1 and 1000:1. A ratio of thickness of plank 330 to thickness of pad 345 of non-fusible link 341 331 may be 2:1, or 10:1, or 100:1, or between 1:1 and 5:1, or between 5:1 and 100:1, or between 50:1 and 1000:1.

The main difference between fusible link 331 and non-fusible link 341 is that a fusible link 331 includes a fuse portion, which may be structured as a neck 333, which is narrower and/or thinner region of electrical conductor, while a non-fusible link 341 may have no fuse portion, i.e., no neck. Neck 333 is a portion of fusible link 331 between the root 335 and pad 337 of the fusible link. Thickness of neck 333 may be the same as thickness of root 335, or between 0.5 and 2.0 times thickness of root 335. Thickness of neck 333 may be the same as thickness of pad 337, or between 0.5 and 2.0 times thickness of pad 337. Cross-sectional area of neck 333 may be smaller than cross-sectional area of root 335 and smaller than cross-sectional area of pad 337. Ratio of cross-sectional area of root 335 to cross-sectional area of neck 333 may be 1.5:1, or 2:1, or 5:1, or 10:1, or between 1:1 and 5:1, or between 5:1 and 20:1. Ratio of cross-sectional area of pad 337 to cross-sectional area of neck 333 may be 1.5:1, or 2:1, or 5:1, or 10:1, or between 1:1 and 5:1, or between 5:1 and 20:1.

Necks 333 of fusible links 331 can protect electrochemical battery cells 115, battery module 103, battery package 101, and a vehicle in an event of cell failure or incipient failure. When an electrochemical cell fails or gets close to failure, its electrical resistance may fall. With reduced electrical resistance, electric current flowing through such cell may increase. This may lead to overheating of the cell and surrounding components. Fusible link 331 that is in contact with such cell may also heat up in proportion to ohmic heating due to the electrical current passing through the fusible link. Ohmic heating of the fusible link may be the highest at the narrowest portion of the fusible link, which is its neck 333. With a proper selection of fusible link material and size of the neck 333, heating to the melting point of that material may be reached before the failure of the cell causes a thermal runaway to occur for the battery package 101. When melting point is reached, neck 333 may melt, thereby breaking an electrical connection between the cell to which that fusible link was attached, and beam 329 of the conductor plate. With no electrical connection, electrical current may not flow through the cell anymore, preventing further deterioration of the cell. In other words, neck 333 may allow fusible link 331 to act as a fuse for the cell or cells to which that fusible link 331 is connected.

Another difference between fusible links 331 and non-fusible links 341 is that pads 337 of fusible links 331 may have an oval shape, while pads 345 of non-fusible links 341 may have a rectangular shape.

Pad 337 of the fusible link 331 may have an orifice 339. Orifice 339 may have a circular shape or an oval shape. Orifice 339 is a through-hole in the pad 337. Orifice 339 may be formed during the same process that forms fusible link 331, or the same process that forms pad 337, or in a separate process after pad 337 is formed. Fusible link 331 and pad 337 may be formed in the same process. If orifice 339 is formed in a separate process, it may be formed by stamping, or by punching, or by cutting, or by drilling. Cutting or drilling may be mechanical or laser cutting or drilling, for example.

Pad 345 of the non-fusible link 341 may have an orifice 347. Orifice 347 may have a rectangular shape, an oval shape, or a rectangular shape with rounded corners. Orifice 347 is a through-hole in the pad 345. Orifice 347 may be formed during the same process that forms non-fusible link 341, or the same process that forms pad 345, or in a separate process after pad 345 is formed. Non-fusible link 341 and pad 345 may be formed in the same process. If orifice 347 is formed in a separate process, it may be formed by stamping, or by punching, or by cutting, or by drilling. Cutting or drilling may be mechanical or laser.

Pads 337 of fusible links 331 and pads 345 of non-fusible links 341 may be connected to electrochemical cells using welding. In an example, laser welding may be used. Ultrasound welding, resistance welding, or another type of welding, may also be used. In an example, all fusible links 331 on the same beam 329 may be located on the same side of the beam 329 relative to the plank 330, while all non-fusible links 341 on that beam 329 may be located on another (opposing) side of the beam from the plank. In an example, all fusible links 331 on the beam 329 and all non-fusible links 341 that are connected to the same beam 329, may be located on the side of the beam where one and the same of the two planks 330 is connected to that beam.

Figure 4A:
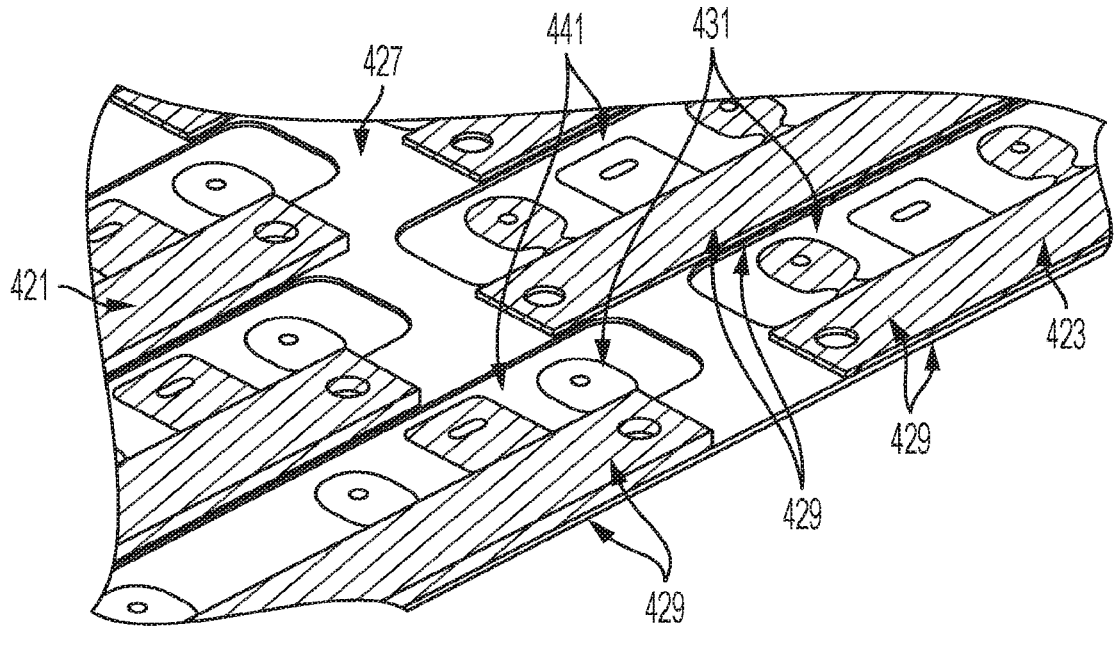
FIGS. 4A-4B are diagrams illustrating an example of fusible and non-fusible links of a conductor plate assembly.
Figure 4B:
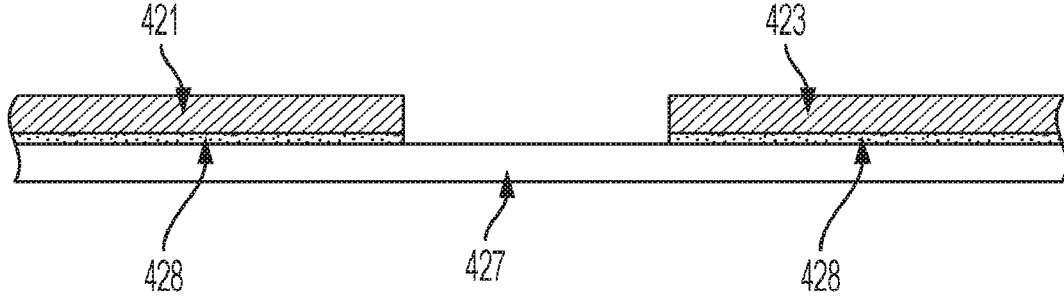

FIG. 4A is a diagram in perspective view (e.g., top perspective view) illustrating an example of fusible and non-fusible links of a conductor plate assembly. This view shows one top conductor end plate 421, one top conductor middle plate 423, and one bottom conductor plate 427. The bottom conductor plate 427 is electrically isolated from the top conductor end plate 421 and the top conductor middle plate 423 with an electrically insulating material (not shown in FIG. 4A), such as electrically insulating sheet or film. FIG. 4B is a cross-sectional view showing a portion of FIG. 4A, where an electrically insulating material 428 is disposed between bottom conductor plate 427 and top conductor plates 421 and 423. When top conductor plates 421, 423 and bottom conductor plates 427 are assembled together into a conductor plate assembly, beams 429 of all conductor plates may be aligned. Beams of adjacent top conductor plates may be aligned longitudinally, in direction of their lengths. Beams of adjacent top conductor plate and bottom conductor plate may be aligned traversely, in a direction perpendicular to their length. When conductor plates are assembled in a conductor plate assembly, there may be a gap between adjacent top conductor plates. This gap between two adjacent top conductor plates may be aligned to a location on the corresponding bottom conductor plate where planks of that bottom conductor plate are located. When conductor plates are assembled in a conductor plate assembly, there may be a gap between adjacent bottom conductor plates. This gap between two adjacent bottom conductor plates may be aligned to a location on the corresponding top conductor plate where planks of that top conductor plate are located.

As shown in the example of FIG. 4A, fusible links 431 and non-fusible links 441 may be spaced apart on their respective conductor plates in such a way that when top conductor plates and bottom conductor plates are assembled into a conductor plate assembly, there may be at least one fusible link adjacent to each non-fusible link, and there may be at least one non-fusible link adjacent to each fusible link.

Figure 5:
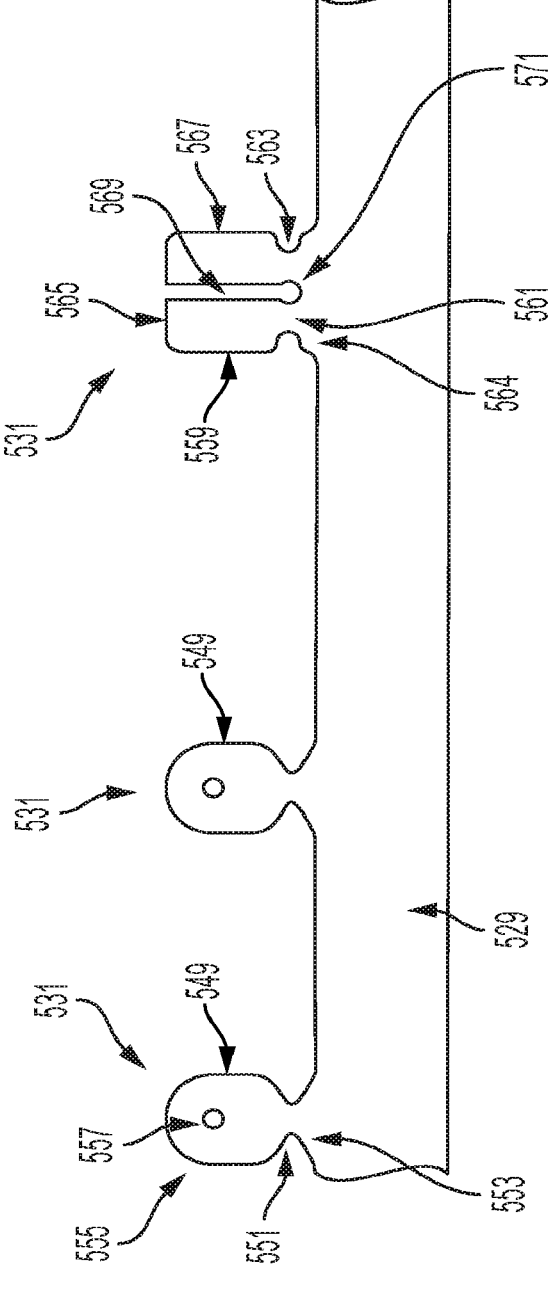
FIG. 5 is a diagram illustrating an example of button and rim fusible links.

FIG. 5 is a diagram illustrating an example of button fusible links and rim fusible links. Beam 529 of the conductor plate may have one or more fusible links 531. Fusible links 531 may be of different types, e.g., a button fusible link 549 and a rim fusible link 559. Button fusible links 549 are designed to be connected to buttons of electrochemical cells. A button of an electrochemical cell is typically a positive terminal of that cell. Rim fusible links 559 are designed to be connected to rims of electrochemical cells. A rim of an electrochemical cell is typically a negative terminal of that cell. The button and rim of a given battery cell may typically be arranged at a same end of the battery cell.

Button fusible link 549 may have a neck 551, a root 553, a pad 555 and an orifice 557. Structure and function of these elements may be the same as discussed above in relation to FIG. 3. Rim fusible link 559 may be designed to be connected to rims of two adjacent cells. Therefore, a pad of the rim fusible link 559 is split into two portions—a first pad 565 and a second pad 567. The first pad 565 and the second pad 567 of the rim fusible link 559 may be separated by a slit 569. Slit 569 may be a straight and narrow opening between two pads 565 and 567. A width of the slit 569 may be smaller than a width of the pads 565 and 567. A ratio of the width of the pads 565 and 567 to the width of the slit 569 may be 1.5:1, or 2:1, or 5:1, or between 1:1 and 2:1, or between 2:1 and 10:1, or between 10:1 and 100:1. Width of the slit 569 may be 0.1 mm, or 1 mm, or 5 mm, or between 0.1 mm and 1 mm, or between 1 mm and 10 mm.

On one end of the slit 569, it may be open. On the other end of the slit 569, it may terminate at the root 564 of the rim fusible link 559. At that terminal end of the slit 569, an expansion 571 may be located. Expansion 571 may serve the purpose of reducing the width of a first neck 561 of the first pad 565 of the rim fusible link 559 and reducing the width of a second neck 563 of the second pad 567 of the rim fusible link 559. In an example, the rim fusible link may be symmetrical with respect to the central axis of the slit 569, such that the areas of the pads 565 and 567 are the same, and the cross-sectional areas of necks 561 and 563 are the same. Term "the same" must be understood within the limits of manufacturing tolerances.

Pads 565 and 567 may be connected to rims of two adjacent electrochemical cells. If one of these two adjacent cells is failing, the corresponding neck of the rim fusible link 559 (neck 561 of pad 565 or neck 563 of pad 567) may melt, which may prevent electrical current from flowing through that failing cell. At the same time, the other one of the two adjacent cells, which is connected to the other one of the two pads, may continue to function normally because its corresponding neck of the same rim fusible link 559 would not melt.

Figure 6A:
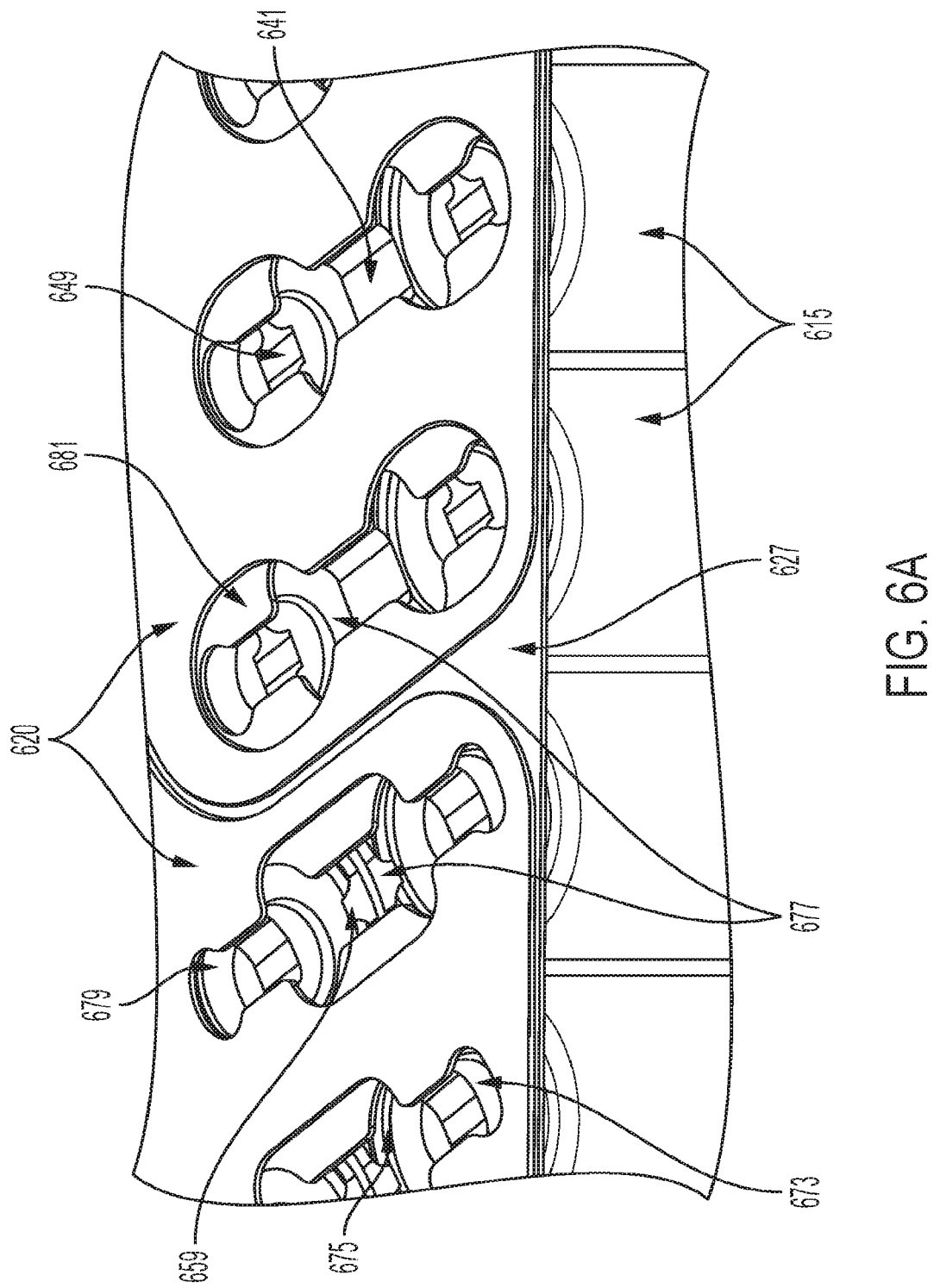
FIGS. 6A-6C are diagrams illustrating an example of fusible and non-fusible links of a conductor plate assembly.
Figure 6B:
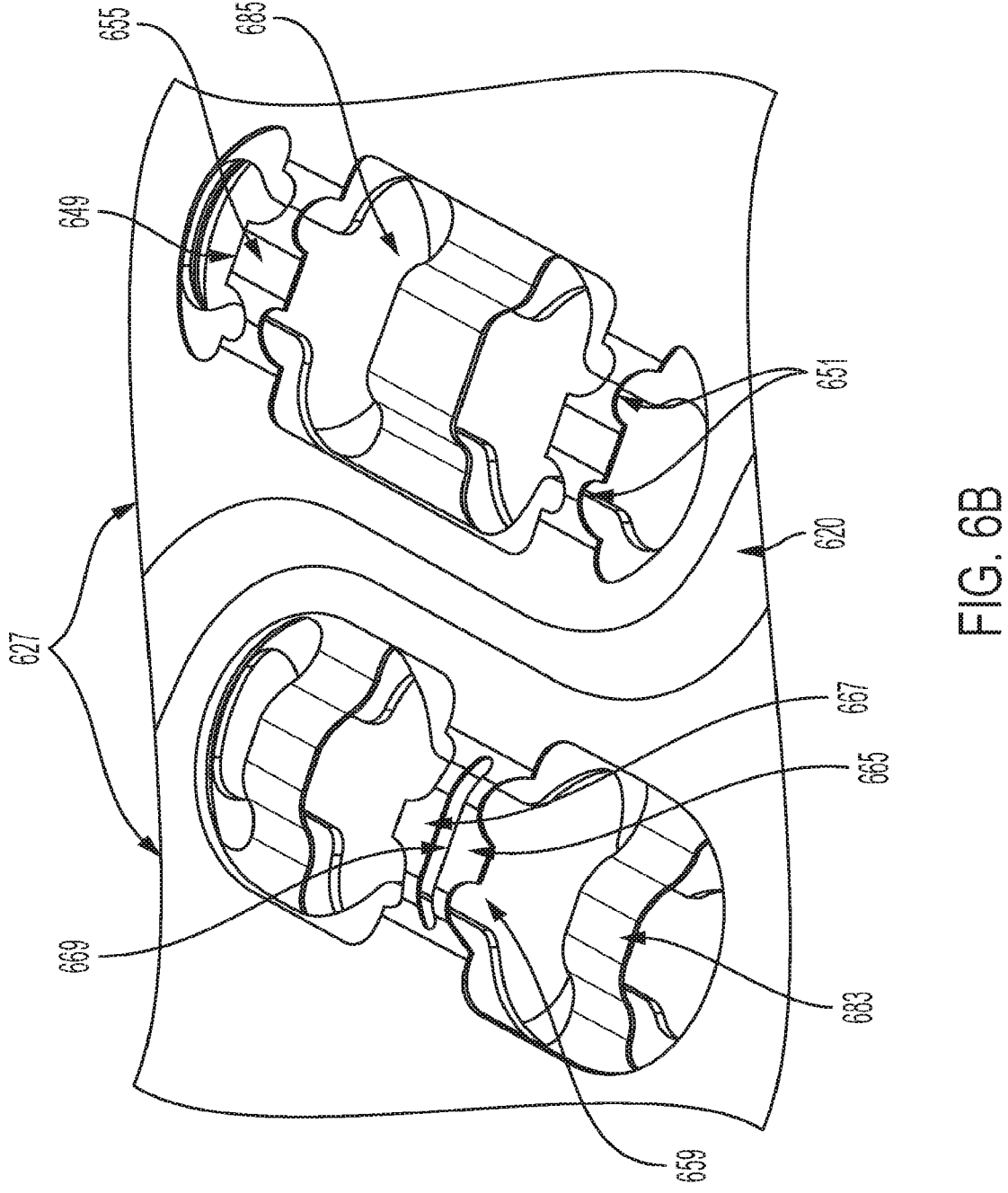
Figure 6C:
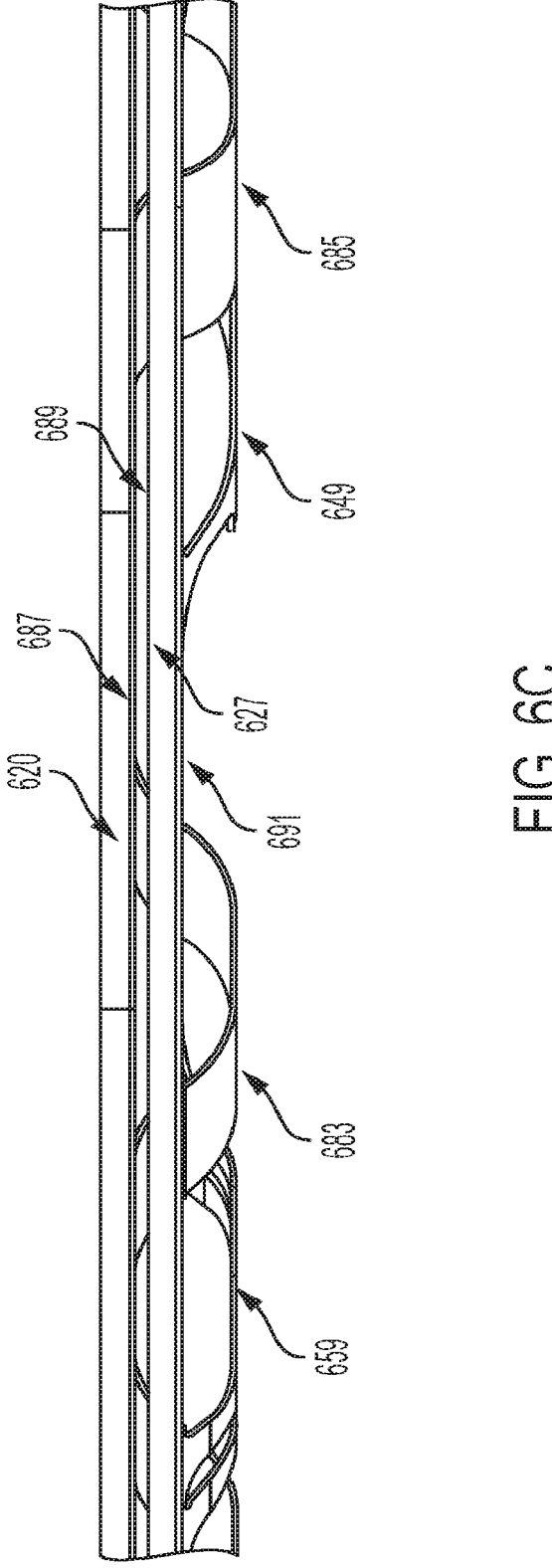

FIGS. 6A-6C are diagrams illustrating an example of fusible and non-fusible links of a conductor plate assembly according to one embodiment. FIG. 6A shows two top conductor plates 620, one bottom conductor plate 627, and electrochemical cells 615. The bottom conductor plate 627 is electrically isolated from the top conductor plates 620 with an electrically insulating material (not shown), such as electrically insulating sheet or film. Each cell 615 may have a button 673, which is typically a positive terminal of the cell. Each cell 615 may have a rim 675, which is typically a negative terminal of the cell. Cells 615 may be cylindrical electrochemical cells with a button on one end of the cylinder. A group of cells 615 may be located parallel to each other. Buttons of all cells in a group may be oriented in the same direction. In a view of FIG. 6A, cells are oriented such that all buttons of cells shown in this view are oriented upward.

Bottom conductor plate 627 may be located between a group of electrochemical cells and two top conductor plates 620. In an embodiment, conductor plates 627 and 620 have apertures 677. Apertures 677 may be of different shapes, e.g., a first shape 679 (e.g., elongated with two end portions that are narrower than a wider center portion) and a second shape 681 (e.g., elongated with two end portions that are wider than narrower center portion). Apertures 677 may be arranged on conductor plates in such a way that when conductor plates are assembled, each aperture 677 with the first aperture shape 679 on the top conductor plate 620 may be superimposed over aperture 677 with the second aperture shape 681 on the bottom conductor plate 627. Each aperture 677 with the second aperture shape 681 on the top conductor plate 620 may be superimposed over aperture 677 with the first aperture shape 679 on the bottom conductor plate 627. Each aperture 677 with the first aperture shape on the bottom conductor plate 627 may correspond to aperture 677 with the second aperture shape 681 on the top conductor plate 620, while each aperture 677 with the second aperture shape 681 on the bottom conductor plate 627 may correspond to aperture 677 with the first aperture shape 679 on the top conductor plate 620.

As noted above, in an example, the first aperture shape 679 may have a larger opening in the middle than at either one of its two ends. In an example, the second aperture shape 681 may have a narrower opening in the middle than at either one of its two ends. This arrangement of aperture shapes may allow for easier access of welding equipment to the buttons 673 and rims 675 of the cells when fusible and non-fusible links are welded to the cells. Apertures may allow access for any appropriate joining tool, including an ultrasonic weld head, a laser weld head, a laser weld fixture, a laser beam. In one embodiment, fusible and non-fusible links are connect to portions of conductor plates at the narrow portions of the apertures. In this embodiment, both ends of fusible and non-fusible links may be connected to portions of the conductor plates. Top conductor plates 620 may carry non-fusible links 641, while bottom conductor plates 627 may carry rim fusible links 659 and button fusible links 649.

FIG. 6B shows a view of conductor plate assembly from the bottom. Non-fusible links may have different width depending on whether they are connected to the button or to the rim of the cells. Rim non-fusible links 685 may be wider than button non-fusible links 683. Each of the rim non-fusible links 685 may have the same width, which may be constant along its length. Each of the button non-fusible links 683 may have the same width, which may be constant along its length. Each of the button fusible links 649 may have a pad 655 located centrally along its length, and two necks 651 on each side of the pad 655. Each of the rim fusible links 659 may have a slit 669, which may separate the first pad 665 of the rim fusible link from the second pad 667 of the rim fusible link. Two pads, 665 and 667, may be symmetrical with respect to the central axis of the slit 669. Each of the pads 665 and 667 may be connected to the corresponding conductor plate on two of its sides.

All fusible and non-fusible links may protrude out of plane of their respective conductor plate toward the cells. Two ends of each fusible and non-fusible link may be connected at (e.g., attached to) portions of its corresponding conductor plate. Pads of each fusible and non-fusible link, which are located near the center of that link, are farthest away from the plane of the corresponding conductor plate.

FIG. 6C shows a cross-sectional view of the conductor plate assembly. The top conductor plate 620 may be located above the bottom conductor plate 627. A non-fusing intermediary layer 687 may be connected to the bottom of the top conductor plate 620. A fusing intermediary layer 691 may be connected to the bottom of the bottom conductor plate 627. A gap 689 between the bottom of the non-fusing intermediary layer 687 and the top of the bottom conductor plate 627 is illustrated in FIG. 6C, and the gap 689 may accommodate an electrically insulating material such as an electrical insulation film (not shown). Rim fusible links 659 may be connected to fusing intermediary layer 691. Button fusing links 649 may also be connected to fusing intermediary layer 691. Rim non-fusible links 685 may be connected to non-fusing intermediary layer 687. Button non-fusing links 683 may also be connected to non-fusing intermediary layer 687.

The electrically insulating film may be designed to withstand voltage up to 2000V, 3000V, 4000V, or 5000V, for example, but is not limited to these values. In a normal operation, a maximum working voltage may be up to, e.g., 500V, or up to 1000V, or up to 2000V. The battery package may be designed to withstand cell-to-cell current within the same cell group between, e.g., 3A and 5A, or between 5A and 10A, but is not limited to these values. Maximum current through individual cells within groups that are connected in series in normal operation may be up to, for example, 50A and range, e.g., between 2A and 30A, or between 5A and 20A, or between 15A and 40A, but is not limited to these values and can be expected to vary within a given application. A conductor plate configuration as described herein may tolerate a maximum current flowing between cell groups, and for the overall battery package, at a given time of up to about 3500A (2200A nominal in normal operation), for example. Typical maximum current flowing through the full battery package at a given time may be up to 2200A (nominal) in normal operation, and the root-mean-square (RMS) current over a given ten minute period may be in various ranges as well in normal operation, e.g., between 50A and 400A, between 300A and 500A, between 100A and 1000A, but is not limited to these values. The battery pack may be designed to operate at maximum current for up to one second, or between one second and two seconds, or between two seconds and twenty seconds, or between twenty seconds and two minutes, for example, but is not limited to these ranges. The battery pack may be designed to operate, for example, at a highest-rated 10 minute RMS current for up to 20 minutes, or between 20 minutes and 1 hour, or between 1 hour and 3 hours, or between 3 hours and 10 hours, for example, but is not limited to these ranges. The fusible link can be designed to not fuse when the maximum current flowing through individual cells is within their normal operating range. The battery may be designed to have a temperature rise over ambient in normal operation of up to 20 degrees C., or up to between 20 degrees C. and 30 degrees C., or up to between 30 degrees C. and 50 degrees C., or between 50 degrees C. and 100 degrees C., for example, but is not limited to these ranges.

Figure 7A:
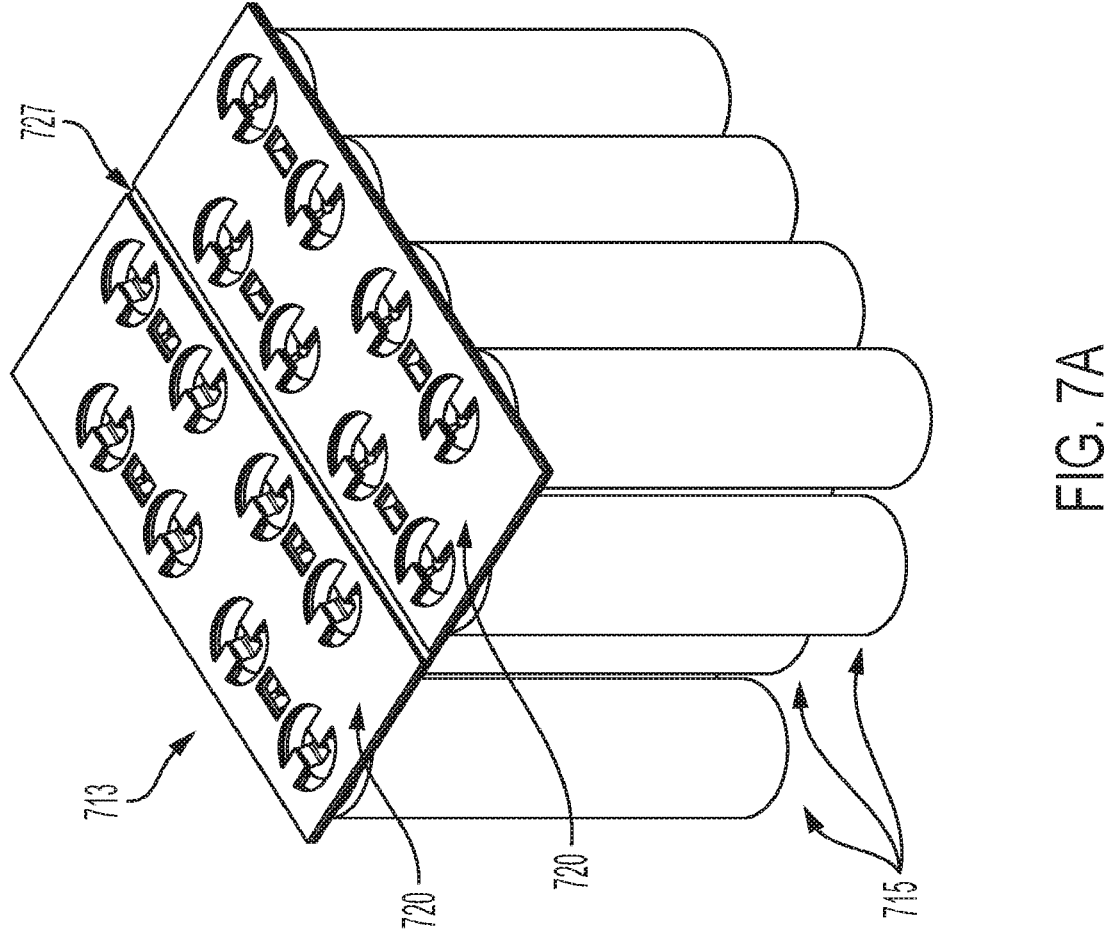
FIGS. 7A-7C are diagrams illustrating an example of a battery with fusible and non-fusible links of a conductor plate assembly.
Figure 7B:
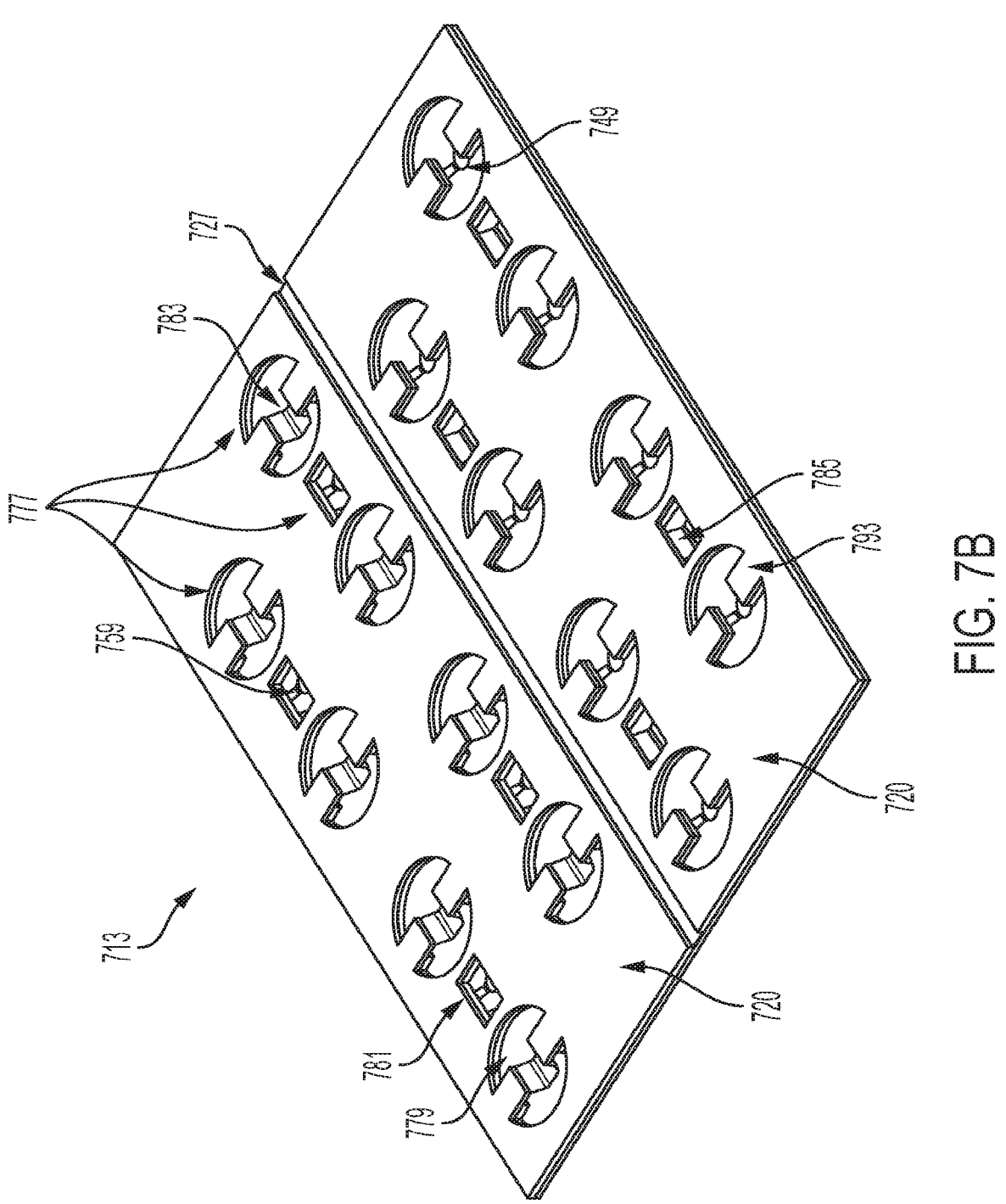
Figure 7C:
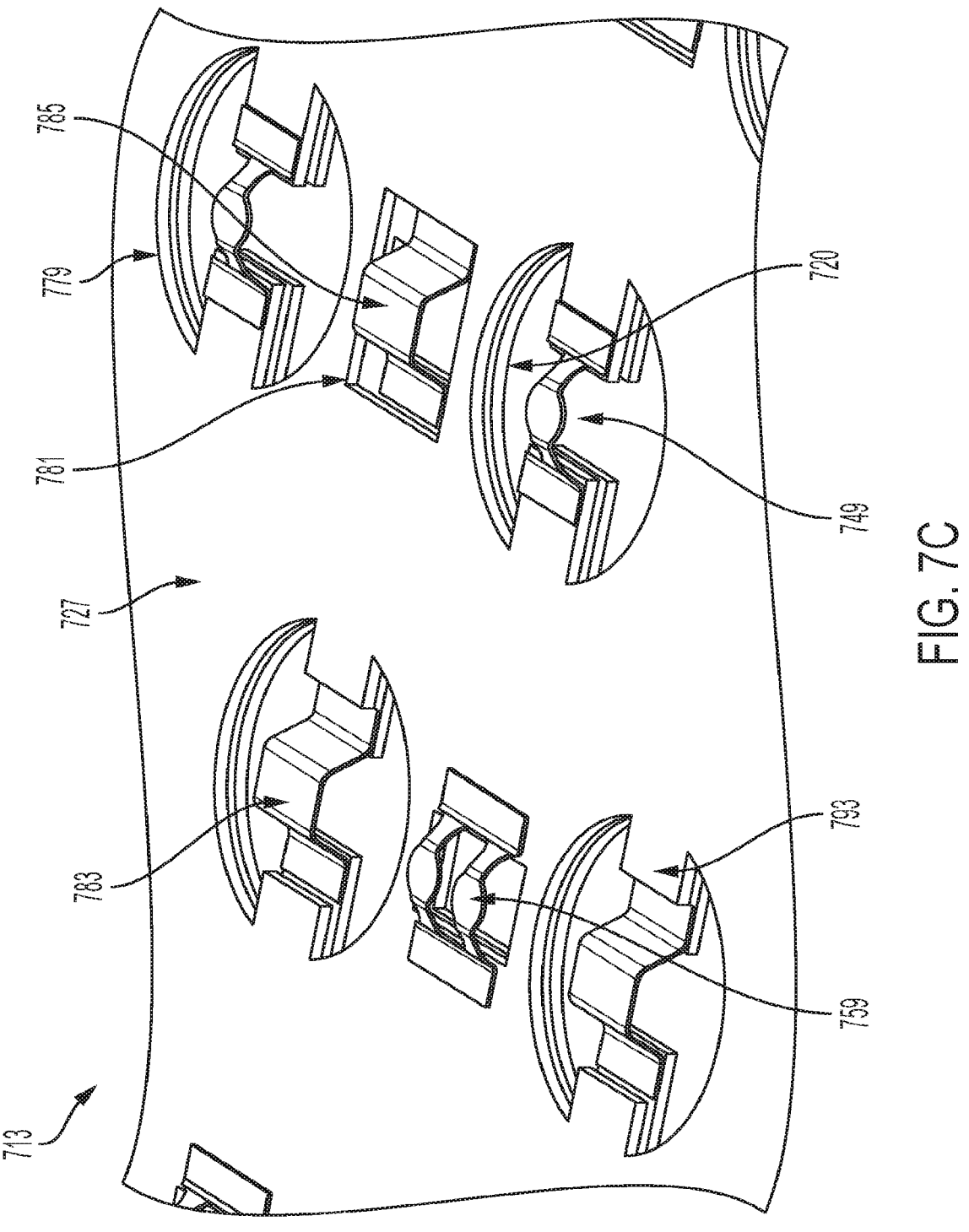

FIGS. 7A-7C are diagrams illustrating an example of a battery with fusible and non-fusible links of a conductor plate assembly. FIG. 7A shows a set of cylindrical electrochemical cells 715. Conductor plate assembly 713 may have top conductor plates 720 and bottom conductor plates 727. In this example, a set of cells has sixteen cells 715 arranged in a 2s8p configuration. This designation means that a set of cells has two groups of eight cells in each set, such that eight cells in each group are connected electrically in parallel, while two groups of cells are connected electrically in series.

FIG. 7B shows a conductor plate assembly 713 from the top. In this example, conductor plate assembly 713 has two top conductor plates 720 and one bottom conductor plate 727. Conductor plates may have apertures 777. Some apertures 777 may have a portion with a circular aperture shape 779, while other apertures 777 may have a portion with rectangular aperture shape 781. Each circular aperture shapes 779 may have two fingers 793 on the diametrically opposing sides. Two fingers 793 may be identical in shape. Each finger 793 may have a rectangular shape. A gap between two fingers 793 of the same aperture may be approximately equal to a width of the fingers. In one embodiment, circular aperture shapes 779 may correspond to buttons of cells 715, while rectangular aperture shapes 781 may correspond to rims of cells 715. Apertures 777 with circular aperture shapes 779 may have button fusible links 749 or button non-fusible links 783. Apertures 777 with rectangular aperture shapes 779 may have rim fusible links 759 or rim non-fusible links 785.

FIG. 7C shows a conductor plate assembly 713 from the bottom. This view shows details of fusible and non-fusible links and apertures of the conductor plates according to one embodiment. The aperture with a rectangular aperture shape 781 on the bottom conductor plate 727 may be of the same size as the corresponding aperture of the same shape on the top conductor plate 720. Such arrangement of apertures with rectangular aperture shape 781 may be used for rim fusible links 759. In this arrangement, the rim fusible link 759 may be connected at (e.g., attached to) the bottom conductor plate 727. The aperture with a rectangular aperture shape 781 on the bottom conductor plate 727 may be larger than the corresponding aperture of the same shape on the top conductor plate 720. Such arrangement of apertures with rectangular aperture shape 781 may be used for rim non-fusible links 759. In this arrangement, the rim non-fusible link 785 may be connected at (e.g., attached to) the top conductor plate 720. In an example, all fusible links are connected at (e.g., attached to) the bottom conductor plate 727.

Fusible links may be made out of thin metal sheet. Metal may be aluminum, or copper, or nickel, or an alloy of aluminum or alloy of copper, or alloy of nickel, or another suitable metal. Fusible links may have thickness of 0.01 mm to 0.1 mm, or between 0.05 mm and 0.2 mm, or between 0.1 mm and 0.5 mm. Fusible links may have width of between 0.1 mm to 0.2 mm, or between 0.2 mm and 1 mm, or between 0.5 mm and 5 mm. Fusible links may have cross-sectional area of, for example, between 0.1 $mm^2$ and 0.2 $mm^2$, or between 0.2 $mm^2$ and 0.5 $mm^2$, or between 0.5 $mm^2$ and 1 $mm^2$, but is not limited to these values.

The aperture with a circular aperture shape 779 on the bottom conductor plate 727 may be of the same size as the corresponding aperture of the same shape on the top conductor plate 720. Such arrangement of apertures with circular aperture shape 779 may be used for button fusible links 749. In this arrangement, the button fusible link 749 may be connected at (e.g., attached to) the bottom conductor plate 727. The aperture with a circular aperture shape 779 on the bottom conductor plate 727 may have shorter fingers 793 than the corresponding aperture of the same shape on the top conductor plate 720. Such arrangement of apertures with circular aperture shape 779 may be used for button non-fusible links 783. In this arrangement, the button non-fusible link 783 may be connected at (e.g., attached to) the top conductor plate 720.

Button fusible links 749, button non-fusible links 783, rim fusible links 759, and rim non-fusible links 785 may all have pads in the center, and each center of each link may have two connections to its corresponding conductor plate. Each center may be protruding away from a plane of the conductor plate assembly 713 on the side of the bottom conductor plate 727. Arrangement and shapes of apertures 777 may be designed to accommodate easy access to the fusible and non-fusible links for their attachment to the cells. In an example, fusible and non-fusible links are laser welded to the cells. Other attachment methods may include ultrasound welding, resistance welding, and other types of welding.

Figure 8A:
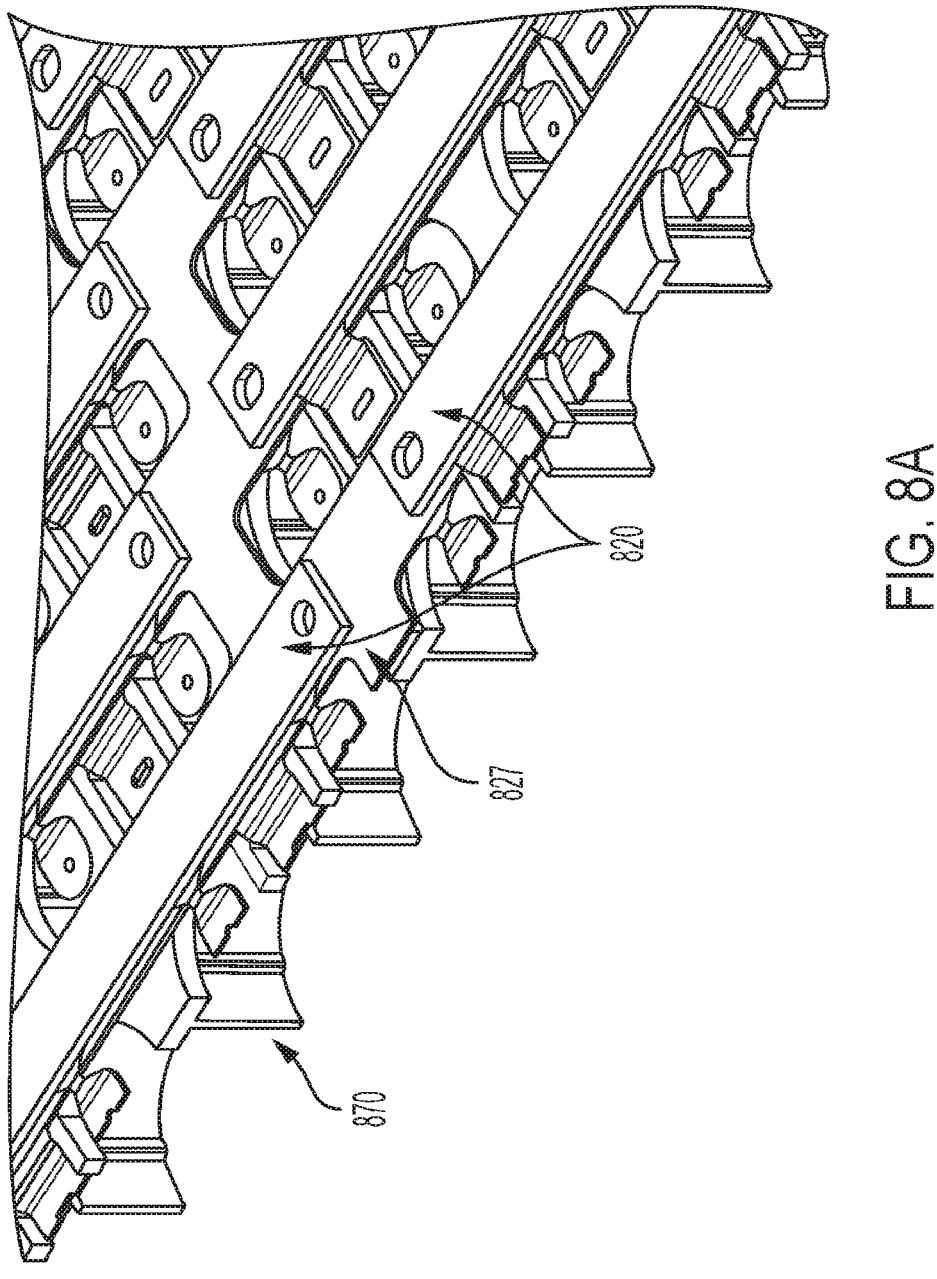
FIGS. 8A-8B are diagrams illustrating an example of a top cell holder.
Figure 8B:
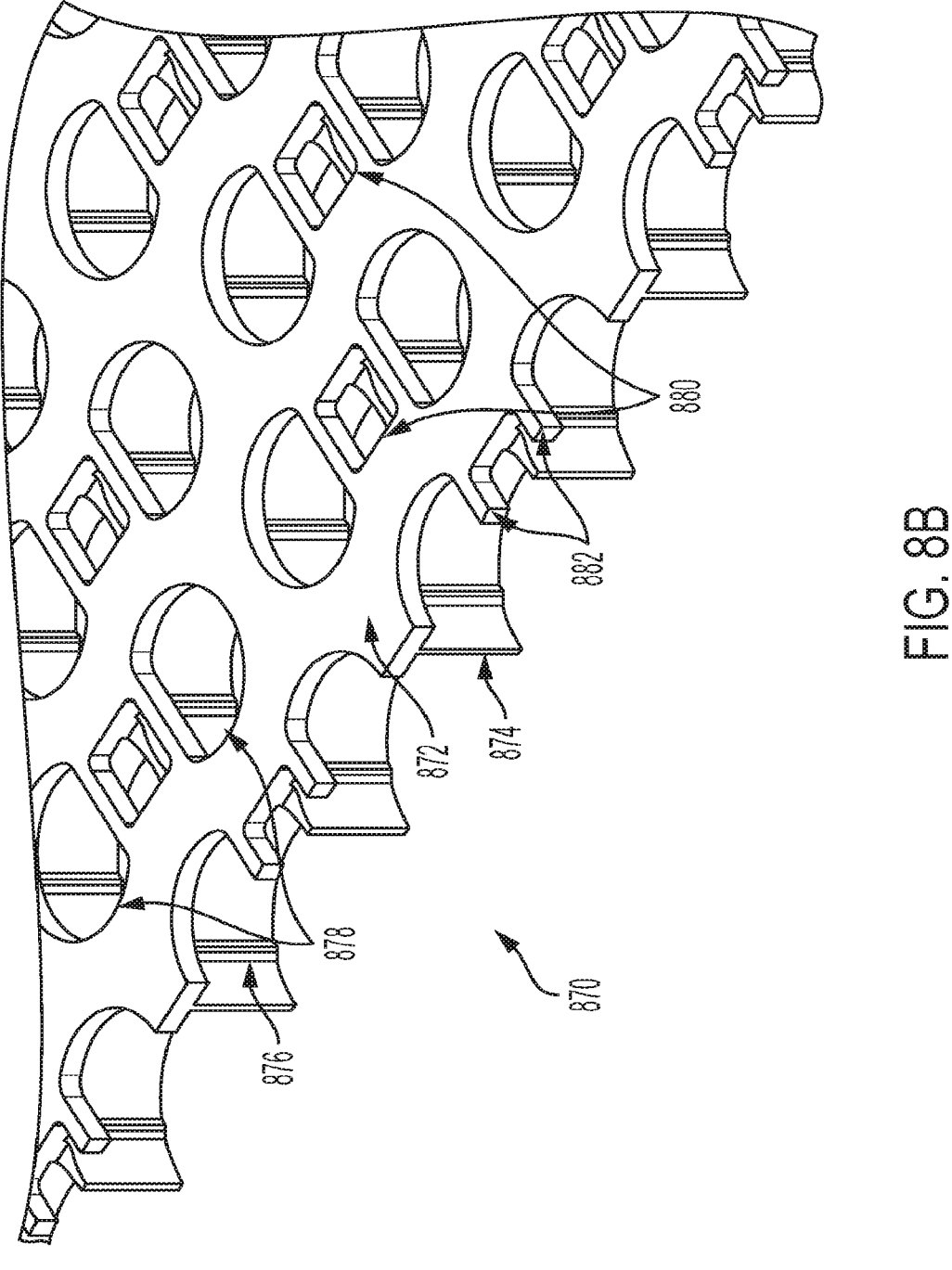

FIG. 8A shows a top cell holder 870 positioned at the conductor plates 820 and 827 and configured to hold the cells (not shown). FIG. 8B show the same top cell holder 870 with conductor plates removed. Top cell holder 870 may be made of non-conducting material, such as injection molded plastic. The cell holder may be fabricated, e.g., by injection molding using a mold that separates into two or more sections and that provides the desired shape of the cell holder 870 when in a closed (molding) position. Suitable materials include, e.g., polycarbonate, polypropylene, nylon, mixtures thereof, etc. The color of the plastic material may be clear, opaque, or colored, e.g., such as black or orange. In order to reduce a potential for damage in a thermal event, flame resistant additives may be included in the plastic materials, such as Tetrabromobisphenol A, Tris (tribromophenyl) cyanurate, or others. For instance, the plastic may be designed to satisfy the UL94 V-0 standard at 3 mm. When end-cooling a densely-packed cylindrical-cell-based battery pack, it may be advantageous to connect the locally top conductor plate 820 to the cell button, and the locally bottom conductor plate 827 to the rim of the cell.

As shown in FIG. 8B, top cell holder 870 may have a substantially plane portion 872, which may be positioned between conductor plates and the cells. The thickness of the substantially plane portion 872 may be, e.g., between 0.5 mm and 2 mm, between 1 mm and 5 mm, between 2 mm and 10 mm, but is not limited to these values. Top cell holder 870 may also have a wall portion 874, which may surround top portions of the sides of the cells. The wall portion 874 may be tapered to be thicker in lateral cross section nearer the conductor plates and narrower in lateral cross section away from the conductor plates.

Thickness of the wall portion 874 may vary, with the smallest thickness occurring along the cross section by a plane passing through central axes of two adjacent cells. The smallest thickness of the wall portion 874 may be between 0.1 mm and 0.5 mm, between 0.2 mm and 1 mm, between 0.5 mm and 2 mm, between 1 mm and 5 mm. The height of the wall portion 874 may be between 1 mm and 5 mm, between 2 mm and 10 mm, between 5 mm and 30 mm, between 10 mm and 50 mm. The wall portion may extend for the full height of the cell. The wall portion 874 may feature locators 876, which may assist in guiding the cells into the top cell holder 870 during assembly, and in locating cells in the top cell holders during operation. The cells may be additionally held by a bottom cell holder, located near the bottom of the cells.

Top cell holder 870 may have access apertures (holes) 878 and 880 for making electrical connections between the conductor plates and the cells. Access aperture (hole) 878 may provide an opening for connecting conductor plates to the buttons of the cells. Access aperture (hole) 880 may provide an opening for connecting conductor plates to the rims of the cells. As the pitch between adjacent cells decreases, the access apertures for rim connections may begin to interfere with mold flow during manufacture of the injection molded part. The arrangement shown in FIGS. 8A-8B may allow closer cell packing that retains mold flow for a continuous injection molded top cell holder 870 at the button end of a collection of cells.

The submodule conductor plates 820 and 827 may be arranged such that they do not cover any of these three apertures per pair of cells (two holes 878 and one hole 880). In one embodiment, the cells may be part of the same parallel brick of cells (group of cells), such that the two buttons are electrically connected to the same conductor plate, and the two rims are electrically connected to the same conductor plate (different from the conductor plate connected to the buttons, in this example). In this embodiment, the cells may be electrically connected to one another in parallel. In one example of this embodiment, the two rims of adjacent cells may use two distinct links to make their electrical connections to the conductor plate. In another example of this embodiment, the two rims of adjacent cells may share a common link.

In another embodiment, the two rims of adjacent cells may be electrically connected to different conductor plates, and the two buttons may likewise be electrically connected to different conductor plates. In one example of this embodiment, the two cells may be electrically connected to one another in series.

In the described top cell holder, with three holes per pair of adjacent cells, the plastic between the conductor plate and cells may otherwise be substantially present at a reasonable thickness, such that there is sufficient plastic cross section 882 between sets of cells to allow the plastic to fully fill the mold without requiring a separate gate on either side of each set of cells. Cross-sectional area of cross-section 882 may be, e.g., between 0.05 mm$^2$ and 0.1 mm$^2$, between 0.2 mm$^2$ and 1 mm$^2$, between 0.5 mm$^2$ and 2 mm$^2$, between 1 mm$^2$ and 5 mm$^2$, between 2 mm$^2$ and 10 mm$^2$, between 5 mm$^2$ and 20 mm$^2$, between 10 mm$^2$ and 100 mm$^2$, but is not limited to these values. Exemplary embodiments may reduce cost and complexity of mold tooling to support increased cell density in a battery pack, and thus reduce the volume requirement of the battery pack.

Figure 9A:
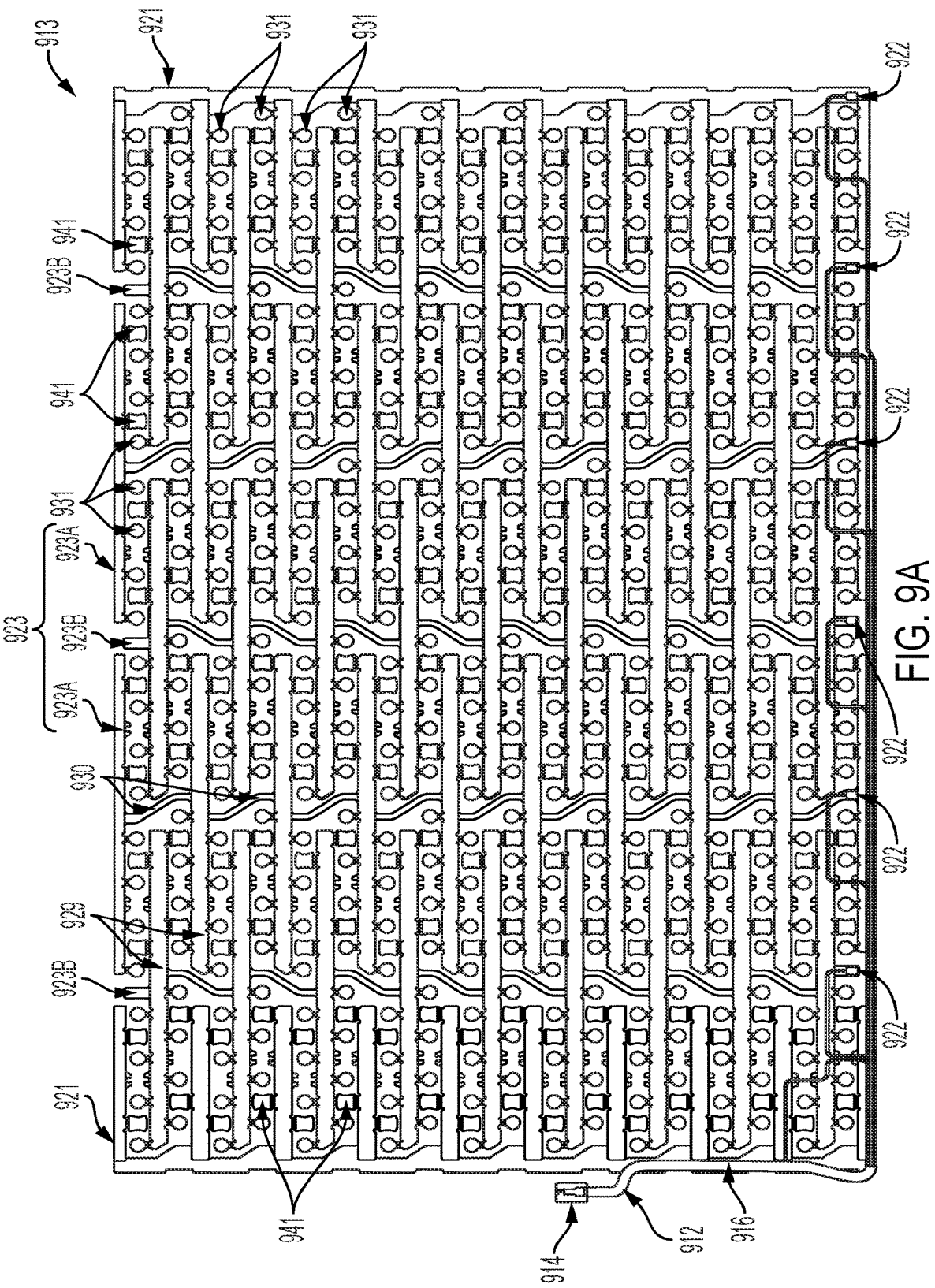
FIG. 9A is a top view illustration of an exemplary conductor plate assembly.

FIG. 9A is a top view illustration of another exemplary conductor plate assembly 913 according to the disclosure. Like conductor plate assembly 113 shown in FIGS. 1A and 1B, conductor plate assembly 913 may be utilized with a battery package such as battery package 101 shown in FIG. 1A. For example, exemplary conductor plate assemblies 913 may be used at a top module of a battery package and at a bottom module of a battery package, along with a cold plate, first frame member (or tray), second frame member, battery cells, and other features, such as top module 103, bottom module 105, cold plate 107, first frame member (or tray) 117, second frame member 118, battery cells 115, and other features such as illustrated in FIG. 1A, whose description is not repeated here for brevity.

Conductor plate assembly 913 provides electrical connection between a plurality of battery cells of a battery package, e.g., such as battery cells 115 of battery package illustrated in FIG. 1A. As shown in FIG. 9A, conductor plate assembly 913 includes a plurality of first conductor plates 923 and at least one second conductor plate 921. In the example of FIG. 9A, five first conductor plates 923 and two second conductor plates 921 are illustrated. As with conductor plate assembly 113, the first conductor plates 923 and the second conductor plates 921 can be made of any suitable electrically conductive material, including, but not limited to, aluminum, copper, nickel, alloys thereof, other metallic alloys, other electrically conductive materials, and combinations thereof, considerations for the selection of which have been previously discussed herein. As with conductor plate assembly

113, conductor plate assembly 913 may include provisions for securing conductor plates to other portions of battery package 101, e.g., tabs, holes, latches, etc., for fastening.

First conductor plates 923 and second conductor plate(s) 921 include beams 929 and planks 930. As shown in the example of FIG. 9A, and as with conductor plate assembly 113 illustrated in FIG. 1A, beams may be elongated portions of metal oriented in one direction (e.g., horizontally in the plane of the page in FIG. 9A), and planks may be elongated portions of metal oriented in another direction (e.g., substantially vertically in the plane of the page in FIG. 9A). As with conductor plate assembly, planks 930 provide electrical interconnection between associated beams 929 of a given conductor plate. Suitable dimensions of planks 930 and beams 929 may be chosen such as previously discussed herein to satisfy current and voltage handling requirements, physical strength requirements, and desired packing density of battery cells, consistent with the overall structure and support provisions provided by the overall battery module and one or more framemembers that support the conductor plate assembly 913. As shown in the example of FIG. 9A, planks 930 may have a bent shape (i.e., not straight) in plan view in the plane of the conductor plate assembly 913, such that two ends of a given plank 930 that intersect respective beams 929 are offset laterally from one another, i.e., shifted laterally from one another, being connected by a bent middle portion of the plank 930. Such bent structure of a plank 930 with offset ends can provide an advantage of providing room for fusible links or non-fusible links at an end of a given beam 929 to enhance packing density of battery cells in the battery package.

Figure 9B:
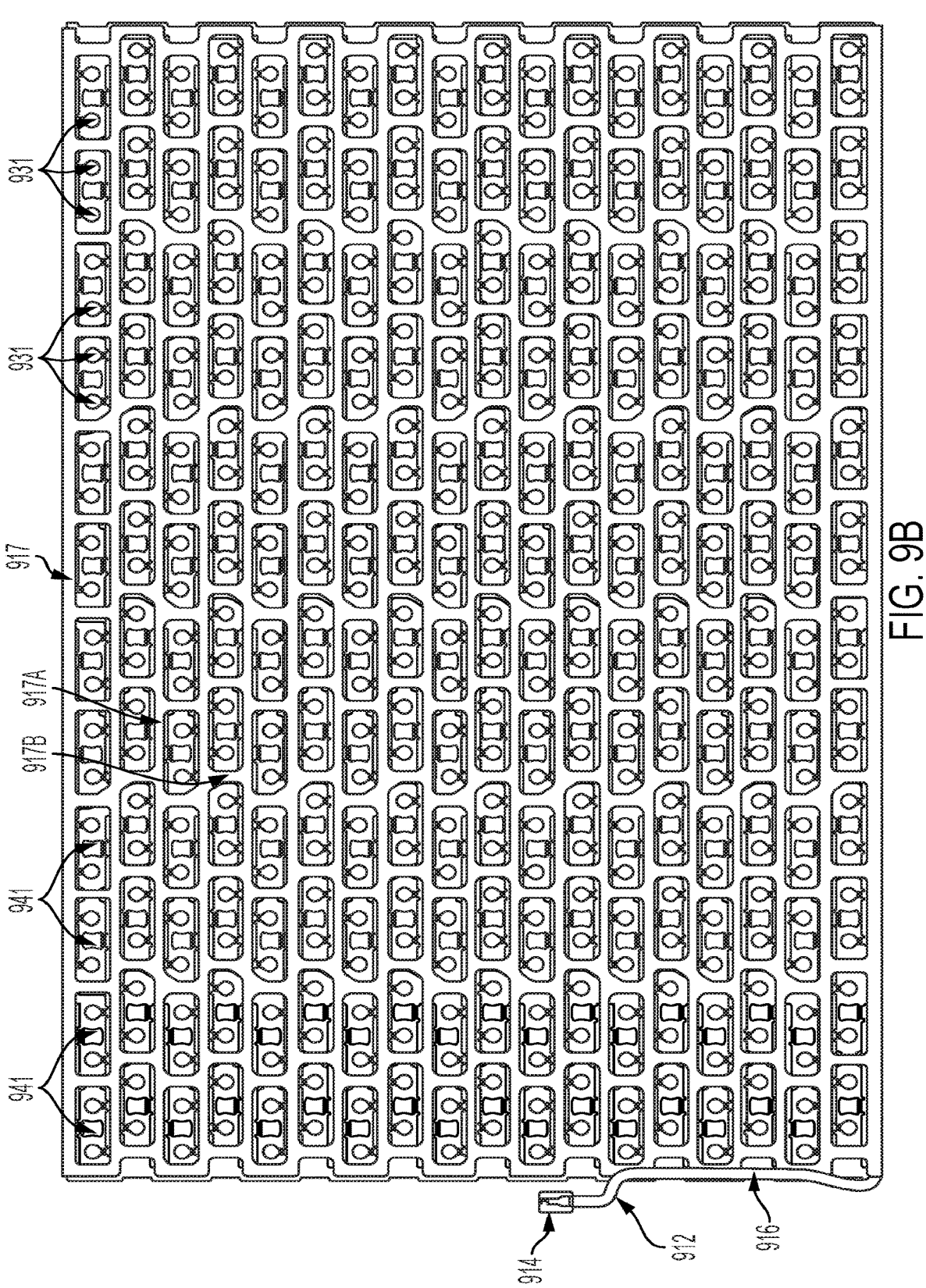
FIG. 9B is a top view illustration of the exemplary conductor plate assembly of FIG. 9A with a frame member attached.

First conductor plates 923 and second conductor plate(s) 921 may be assembled together to make a conductor plate assembly 913. Referring to FIG. 9B, in an example, a frame 917, which may be, e.g., an electrically insulating injection-molded plastic frame or other frame that provides sufficient structural support and electrical isolation, may provide support for the first and second conductor plates 923 and 921 through attachment of the first and second conductor plates 923 and 921 to the frame 917. Conductor plates 923, 921 may be attached to the frame, using any suitable fastening approach as previously described herein, including adhesives, such as, for example, any suitable methyl methacrylate adhesives, as well as, depending upon the materials used for the electrically insulating frame, heat staking, ultrasonic welding, laser welding, and mechanically snapping pieces together. As illustrated in the example of FIG. 9B, frame 917 may include, such as in the configuration illustrated, interconnected ribs that extend in two or more directions, e.g., such as ribs 917A oriented in a first direction and ribs 917B oriented in a second direction substantially perpendicular to the first direction (e.g., in horizontally and vertically in top view of the plane of the paper of FIG. 9A, for convenient reference). The disclosure is not limited to such exemplary directions, however, and ribs oriented in other directions may be used, and ribs may be oriented in more than two directions. The positions and orientations of such ribs 917A, 917B may correspond to the positions and orientations of the associated beams 929 and planks 930 of the conductor plates 923, 921, and may further be provided at additional locations for additional structural stability (e.g., an additional frame rib 917B may be provided at one or more positions between adjacent planks 930). In addition, the frame 917 may also include an outer peripheral portion at a circumference of the frame 917. As illustrated in FIGS. 9A and 9B, when assembled, a conductor plate assembly 913 may have an overall rectangular shape outline in top view or bottom view, but the outline is not limited to a rectangular shape. When so assembled, and absent battery cells connected to conductor plates 932, 921, the conductor plates are electrically isolated from one another by electrically insulating material of the frame 917. The dimensions of the frame 917 and its ribs 917A, 917B may generally correspond to the dimensions of the associated beams 929 and planks 930 of conductor plate assembly 913. The dimensions of other conductor plates, beams, and planks previously described herein are applicable to conductor plate assembly 913. The thickness of the frame 917 (i.e., in a direction perpendicular to the plane of the page for FIG. 9B) may be chosen to provide sufficient electrical isolation and structural support, consistent with and in view of the support provided by other structural members of the battery package, and such thickness may be, for example, between 1 mm and 5 mm, between 2 mm and 10 mm, between 5 mm and 30 mm, between 10 mm and 50 mm, though the thickness is not limited to these values. In addition, noting that frame 917 and conductor plate assembly 913 are provided at a button-and-rim side of a collection of battery cells (e.g., top side, for convenient reference), it will be appreciated that a cell holder, such as cell holder 870 illustrated in FIGS. 8A and 8B, may be provided at an opposite side of the collection of battery cells (e.g., bottom side, for convenient reference). In this way, a collection of battery cells in a battery package (such as battery package 101 illustrated in FIG. 1A) may be supported at both the top and bottom ends thereof. As previously noted, a cold plate such as cold plate 107 illustrated in FIG. 1A) may be utilized with a single-module arrangement (e.g., using only module 103 illustrated in FIG. 1A) or a dual-module arrangement (e.g., e.g., using both modules 103 and 105 illustrated in FIG. 1A).

As with conductor plate assembly 913, adjacent conductor plates 923 and/or 921 may have an interdigitated structure whereby beams 929 of one conductor plate 923, 921 extend adjacent to and between beams 929 of one or two adjacent conductor plates 923, 921. Such interdigitated structure can facilitate an increased packing density of battery cells.

As shown in the example of FIG. 9A, first conductor plates 923 may include a first type 923A of conductor plate, which may be considered an outside or outboard type, because that type includes beams 929 that are positioned at an outer edge of the conductor plate assembly 913. As shown in the example of FIG. 9A, first conductor plates 923 may also include a second type 923B of conductor plate, which may be considered an inside or inboard board type, because none of the beams 929 of that type includes are positioned at an outer edge of the conductor plate assembly 913.

As shown in FIG. 9A, the conductor plate assembly 913 may also include a plurality of fusible links 931 at a second conductor plate 921 (at the right side of FIG. 9A in this example) configured to connect the second conductor plate 921 to multiple battery cells. The conductor plate assembly 913 may also include a plurality of non-fusible links 941 at the plurality of first conductor plates 923 configured to connect the plurality of first conductor plates 923 to plural battery cells. As also shown in FIG. 9A, another second conductor plate 921 (e.g., at the left-hand side of FIG. 9A in this example) may include multiple non-fusible links 941 at that other second conductor plate. In an example, such as illustrated in FIG. 9A, one second conductor plate 921 (e.g., right-hand side of FIG. 9A) may include only fusible links 931 and be devoid of non-fusible links 941. In addition, in an example, another (different) second conductor plate 921

(e.g., left-hand side of FIG. 9A) of the conductor plate assembly 913 may include only non-fusible links 941 and be devoid of fusible links 931. However, the disclosure is not limited to such, and one or more second conductor plates may include both fusible links 931 and non-fusible links 941. Also, the plurality of first conductor plates may each include both fusible links 931 and non-fusible links 941. In addition, fusible links may be either of the button type (button fusible links) or rim type (rim fusible links), and non-fusible links may be of the button type (button non-fusible links) or rim type (rim non-fusible links), such as previously described herein, the previous discussion of which herein, including discussion of configuration, materials, and dimensions, is applicable to the examples of FIGS. 9A-9E.

Figure 9C:
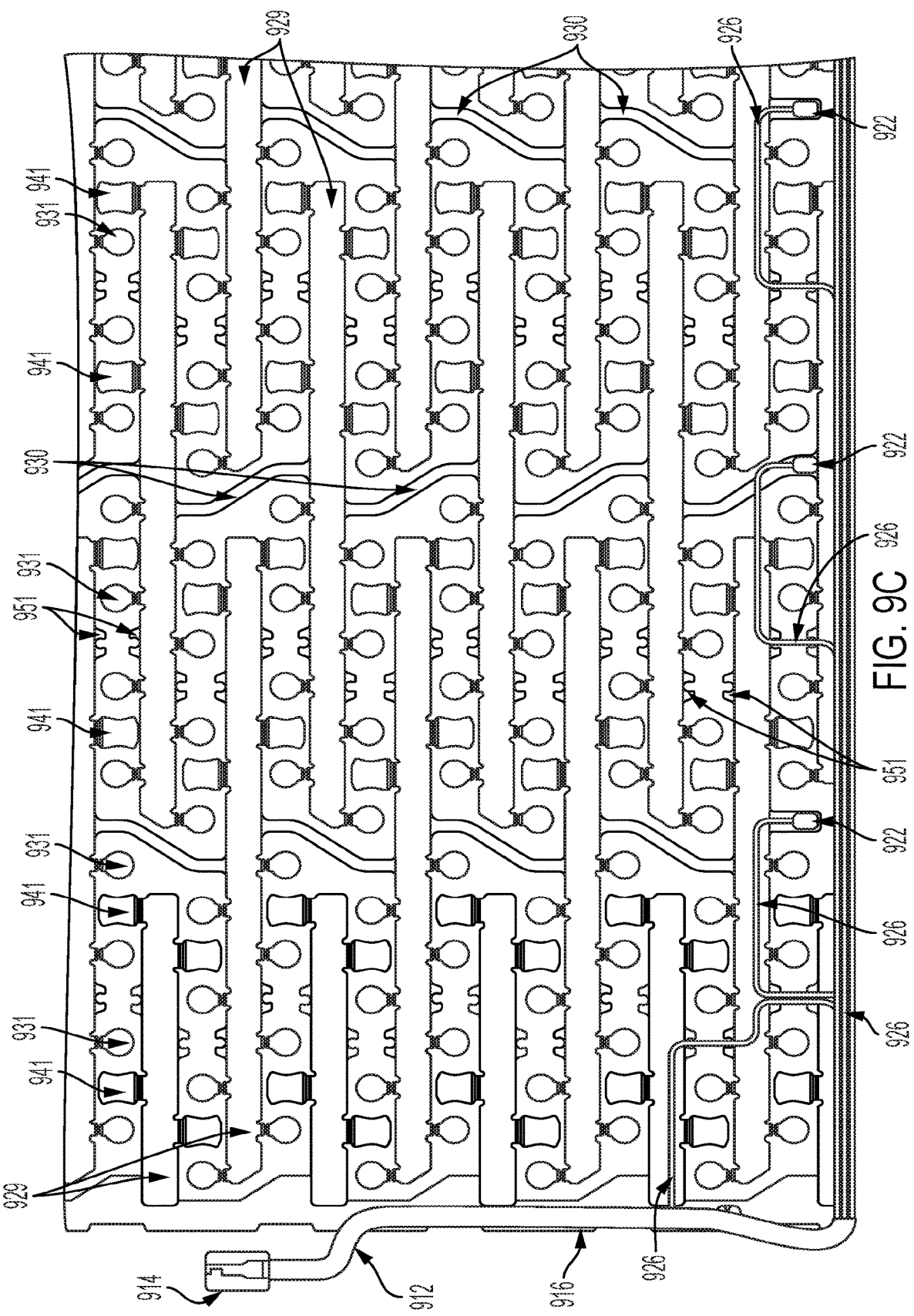
FIG. 9C is a top view illustration of a lower left portion of the exemplary conductor plate assembly illustrated in FIG. 9A.

FIG. 9C is a top view illustration of a lower left portion of the exemplary conductor plate assembly illustrated in FIG. 9A in expanded view. As shown in FIGS. 9A, 9B and 9C, a wiring harness 912 including an electrical connector 914, a cable 916 and multiple sub-cables 926 may be provided to monitor the voltages at the various conductor plates 923, 921. In particular, sub-cables 926 may attach to conductor plates 923, 921 at connection points 922 for voltage monitoring, using suitable voltage monitoring circuitry (not shown). In addition, as shown in FIG. 9C, conductor plates 923, 921 also include alignment features (prongs or fingers) 951 that facilitate proper alignment of the conductor plates 923, 921 with frame, as discussed further with reference to FIG. 9D.

Figures 9D, 9E:
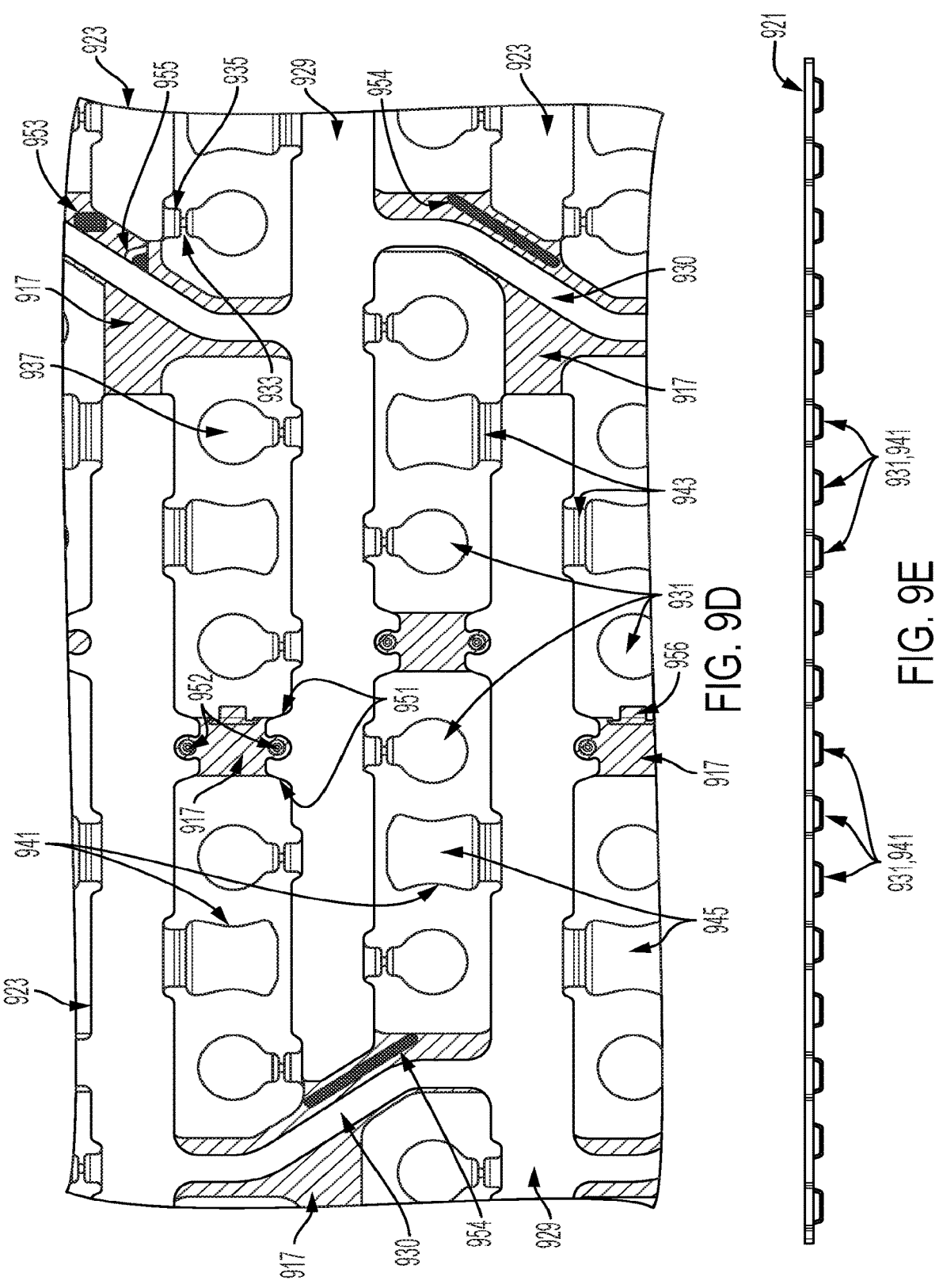
FIG. 9D shows a bottom view of a portion of the exemplary conductor plate assembly illustrated in FIG. 9B.
FIG. 9E is a side view of a portion of the exemplary conductor plate assembly illustrated in FIG. 9A viewed from the right without the wiring harness.

FIG. 9D shows a bottom view of a portion of the exemplary conductor plate and frame assembly illustrated in FIG. 9B. In particular, FIG. 9D shows an expanded view at higher magnification of two adjacent first conductor plates 923, each having beams 929 and planks 930, such as previously described above. The conductor plates 923 are attached to frame 917 using any suitable fastening means such as adhesive. The frame 917, which again may be or comprise injection molded plastic, includes multiple first alignment features, e.g., pegs or pins 952, and the conductor plates 923 (and 921) include second alignment features, e.g., prongs or fingers 951, whereby the prongs/fingers 951 are positioned around pegs/pins 952 to align the structures during assembly. In addition, the frame 917 includes protruding spacers 954 and 953 that serve to separate portions of adjacent conductor plates 923 (and 921) to further facilitate alignment during assembly. As shown in FIG. 9D, the frame 917 may also include cable guides 955 that comprise an aperture through which a cable or wire may pass, and a tab above the aperture to assist in holding the cable or wire in place. The frame 917 may also include tabs 956 on either vertical ribs or horizontal ribs to assist with securing additional electrically insulating sheet that may be placed over the top of the conducting plate/frame assembly, if desired.

In the example illustrated in FIGS. 9A-9E, and as shown in expanded view in FIG. 9D, each fusible link 931 of the example includes a pad 937 that has a rounded, somewhat circular shape, and is positioned to coincide with a button of an associated battery cell. Such fusible links 931, in this example, are button fusible links. As shown in FIG. 9D, and as previously described, the button fusible links 931 may include a neck 933, which is a fusing portion, a pad 937, and a root 935, wherein the neck 933 has a smaller cross-sectional area than the root 935 and the pad 937. The small cross sectional area of the neck 933 permits it to serve as a fusing portion. Additionally, the non-fusible links 941 in this example, as shown in FIG. 9D, have pads 945 with a somewhat rectangular shape with indented sides. Those non-fusible links 941 include a root 943 and the pad 945, but no fusing portion. In this example, each pad 945 is positioned to coincide with rims of two associated battery cells, a portion of one rim of one battery cell connecting to one side of pad 945, and a portion of the rim of the other battery cell connecting to the opposite side of pad 945. In this example, such non-fusible links are rim non-fusible links. However, the disclosure is not limited to such, and, as noted previously, one or more first conductor plates and one or more second conductor plates may include both fusible links 931 and non-fusible links 941. In addition, fusible links may be either of the button type (button fusible links) or rim type (rim fusible links), and non-fusible links may be of the button type (button non-fusible links) or rim type (rim non-fusible links), such as previously described herein. Also, while the fusible links 931 and non-fusible links 941 referred to in the examples of FIGS. 9A-9E are not illustrated with slits or orifices (apertures), the pads or other portions of fusible links 931 and non-fusible links 941 may be provided with slits and/or orifices/apertures if desired. In addition, other aspects of fusible and non-fusible links previously described herein, including discussion of configuration, materials, and dimensions, fabrication, etc, is applicable to the examples of FIGS. 9A-9E.

Accordingly, it will be appreciated that, in an example, each of the plurality of battery cells may comprise a button and a rim, and that the plurality of fusible links 931 may comprise button fusible links, and that the plurality of non-fusible fusible links 941 may comprises rim non-fusible links. Alternatively or in addition, in an example, the plurality of fusible links 931 may comprise rim fusible links, and the plurality of non-fusible links 941 may comprise button non-fusible links. Moreover, in an example, each of first conductor plates 923 may comprise button links that connect to buttons and may further comprise rim links that connect to rims, such that a first one of the second conductor plates 921 comprises button links that connect to buttons and is devoid of rim links that connect to rims, and wherein a second one of the second conductor plates comprises rim links that connect to rims and is devoid of button links that connect to buttons.

FIG. 9E is a side view (not a cross section) of a portion of the exemplary conductor plate assembly illustrated in FIG. 9A viewed from the right without the wiring harness. As shown in FIG. 9E, when conductor plate assembly 913 of FIG. 9A is viewed from the right side, the side of second conductor plate 921 is visible, as is a row of fusible links 931 and portions of the adjacent row of non-fusible links 941. Additional rows of fusible links 931 and non-fusible links 941 farther toward the left side of FIG. 9A are obscured in the side view shown in FIG. 9E. Similarly, additional conductor plates 923 and 921 farther toward the left side of FIG. 9A are obscured in FIG. 9E. The example of FIG. 9E illustrates, as is also evident from the discussion of FIGS. 9A-9D, that the first conductor plates 923 and second conductor plate(s) 921 may be arranged in a planar configuration such that the first conductor plates 923 and the second conductor plate(s) 921 are disposed in a same plane, and that the fusible links 931 and non-fusible links 941 include portions that extend below the plane of the conductor plates 923, 921, in order to make electrical contact with buttons and rims of corresponding battery cells.

Referring back to the examples of FIGS. 2A-4B, it will be appreciated the first conductor plates and second conductor plate(s) alternatively may be arranged in a stacked configuration such that the first conductor plates are disposed in a first plane and the second conductor plate(s) is disposed in a second plane, the first plane and second plane being displaced from one another in a direction perpendicular to the first plane and the second plane. In such case, a layer of electrically insulating material may separate the first conductor plates and the second conductor plate(s), such as shown, for example, in FIGS. 4A and 4B wherein first conductor plates 421 and 423 are separated from bottom conductor plate(s) 427 by electrically insulating material 428. In some examples, it is envisioned that a given battery package may utilize a battery module with a conductor plate assembly of a planar configuration and a battery module with conductor plate assembly of a stacked configuration.

It should be understood that the disclosure pertaining to FIGS. 1A-8B above is intended to be applicable to the examples disclosed in FIGS. 9A-9E, and that all variations and combinations relating to described features including, but not limited to, shapes, materials, dimensions, fabrication, connections, fastening, etc., of conductor plates, fusible and non-fusible links, cell holders, cooling features, safety protection features, structural members such as frame members and side plates, battery modules, and battery packages, etc., are intended to apply to the examples described in connection with FIGS. 9A-9E.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. It should also be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply. In addition, as used in the description herein and throughout the claims that follow, the meaning of "about" and/or "approximately" refers to ±10% of the quantity indicated, unless otherwise indicated. In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. Other implementations may be within the scope of the following claims.

What is claimed is:

1. A battery assembly, comprising:
a first conductor plate comprising:
   a first plurality of beams;
   a first plurality of planks, wherein each set of two adjacent beams of the first plurality of beams is connected by a respective single plank of the first plurality of planks; and
   a plurality of pads extending from the first plurality of beams and connected to a plurality of battery cells, wherein each pad of the plurality of pads is connected to two battery cells of the plurality of battery cells; and
a second conductor plate comprising a second plurality of beams, wherein a beam of the second plurality of beams comprises a plurality of fusible links connected to the plurality of battery cells, wherein each set of two adjacent beams of the second plurality of beams is connected by a respective plank of a second plurality of planks, and wherein at least one pad of the plurality of pads is disposed between a first fusible link and a second fusible link of the plurality of fusible links.

2. The battery assembly of claim 1, wherein at least another pad of the plurality of pads is disposed between another first fusible link and another second fusible link of the plurality of fusible links adjacent to the at least one pad.

3. The battery assembly of claim 1,
wherein the plurality of fusible links connect the second conductor plate to second battery cells of the plurality of battery cells, with multiple fusible links coupled between the second plurality of beams between adjacent second planks of the second plurality of planks; and
wherein the plurality of pads comprise a plurality of non-fusible links connecting the first conductor plate to first battery cells of the plurality of battery cells, with multiple non-fusible links coupled between the first plurality of beams between adjacent first planks of the first plurality of planks.

4. The battery assembly of claim 3, further comprising multiple second conductor plates, wherein one of the multiple second conductor plates comprises only fusible links and is devoid of non-fusible links.

5. The battery assembly of claim 4, wherein another of the multiple second conductor plates comprises only non-fusible links and is devoid of fusible links.

6. The battery assembly of claim 3, wherein each of the plurality of battery cells comprises a button and a rim, wherein the plurality of fusible links comprise button fusible links, and wherein the plurality of non-fusible links comprise rim non-fusible links.

7. The battery assembly of claim 3, wherein each of the plurality of battery cells comprises a button and a rim, wherein the plurality of fusible links comprise rim fusible links, and wherein the plurality of non-fusible links comprise button non-fusible links.

8. The battery assembly of claim 3, wherein each of the plurality of battery cells comprises a button and a rim,
   wherein the plurality of fusible links comprise button fusible links and rim fusible links, and
   wherein the plurality of non-fusible links comprise button non-fusible links and rim non-fusible links.

9. The battery assembly of claim 1, wherein each of the plurality of battery cells comprises a button and a rim,
   wherein the first conductor plate comprises button links that connect to buttons and rim links that connect to rims, wherein the second conductor plate comprises multiple second conductor plates,
   wherein one of the multiple second conductor plates comprises button links that connect to buttons and is devoid of rim links that connect to rims, and
   wherein another of the multiple second conductor plates comprises rim links that connect to rims and is devoid of button links that connect to buttons.

10. The battery assembly of claim 1, wherein the first conductor plate and the second conductor plate are arranged in a stacked configuration such that the first conductor plate is disposed in a first plane and the second conductor plate is disposed in a second plane, the first plane and second plane being displaced from one another in a direction perpendicular to the first plane and the second plane.

11. The battery assembly of claim 1, wherein the first conductor plate and the second conductor plate are arranged in a planar configuration such that the first conductor plate and the second conductor plate are disposed in a same plane.

12. The battery assembly of claim 1, further comprising:
a first battery package comprising a first portion of the plurality of battery cells;
a second battery package comprising a second portion of the plurality of battery cells; and
a cold plate disposed between or adjacent to the first battery package and the second battery package.

13. A conductor plate for providing an electrical connection between a plurality of battery cells of a battery assembly, the conductor plate comprising:
a first plurality of beams;
a first plurality of planks, wherein each set of two adjacent beams of the first plurality of beams is connected by a respective single plank of the first plurality of planks; and
a plurality of pads arranged along the first plurality of beams on a first side of the respective single planks, wherein the plurality of pads are connected to the plurality of battery cells; and
wherein a beam of the first plurality of beams comprises a plurality of fusible links arranged on a second side of the respective single planks opposite the first side, wherein the plurality of fusible links are connected to the plurality of battery cells.

14. The conductor plate of claim 13, wherein:
the conductor plate comprises a first conductor plate comprising the first plurality of beams coupled with the first plurality of planks; and
the conductor plate comprises a second conductor plate comprising a second plurality of beams coupled with a second plurality of planks;
wherein the plurality of fusible links connect the first conductor plate to first battery cells of the plurality of battery cells; and
wherein the plurality of pads comprise a plurality of non-fusible links connecting the first conductor plate to the first battery cells.

15. The conductor plate of claim 14, further comprising multiple second conductor plates, wherein one of the multiple second conductor plates comprises only fusible links and is devoid of non-fusible links.

16. The conductor plate of claim 15, wherein another of the multiple second conductor plates comprises only non-fusible links and is devoid of fusible links.

17. The conductor plate of claim 14, wherein each of the plurality of battery cells comprises a button and a rim, wherein the plurality of fusible links comprise button fusible links, and wherein the plurality of non-fusible links comprise rim non-fusible links.

18. The conductor plate of claim 14, wherein each of the plurality of battery cells comprises a button and a rim, wherein the plurality of fusible links comprise rim fusible links, and wherein the plurality of non-fusible links comprise button non-fusible links.

19. The conductor plate of claim 14, wherein each of the plurality of battery cells comprises a button and a rim, wherein the first conductor plate comprises button links that connect to buttons and rim links that connect to rims, wherein the second conductor plate comprises multiple second conductor plates, wherein one of the multiple second conductor plates comprises button links that connect to buttons and is devoid of rim links that connect to rims, and wherein another of the multiple second conductor plates comprises rim links that connect to rims and is devoid of button links that connect to buttons.

20. The conductor plate of claim 14, wherein the first conductor plate and the second conductor plate are arranged in a first plane, and wherein the first conductor plate and the second conductor plate displaced from another conductor plate in a direction perpendicular to the first plane.

21. The conductor plate of claim 14, wherein the first conductor plate and the second conductor plate are arranged in a planar configuration such that the first conductor plate and the second conductor plate are disposed in a same plane.

22. The conductor plate of claim 14, wherein each of the plurality of battery cells comprises a button and a rim, wherein the plurality of fusible links comprises button fusible links and rim fusible links, and wherein the plurality of non-fusible links comprises button non-fusible links and rim non-fusible links.

\* \* \* \* \*